Figure 1:
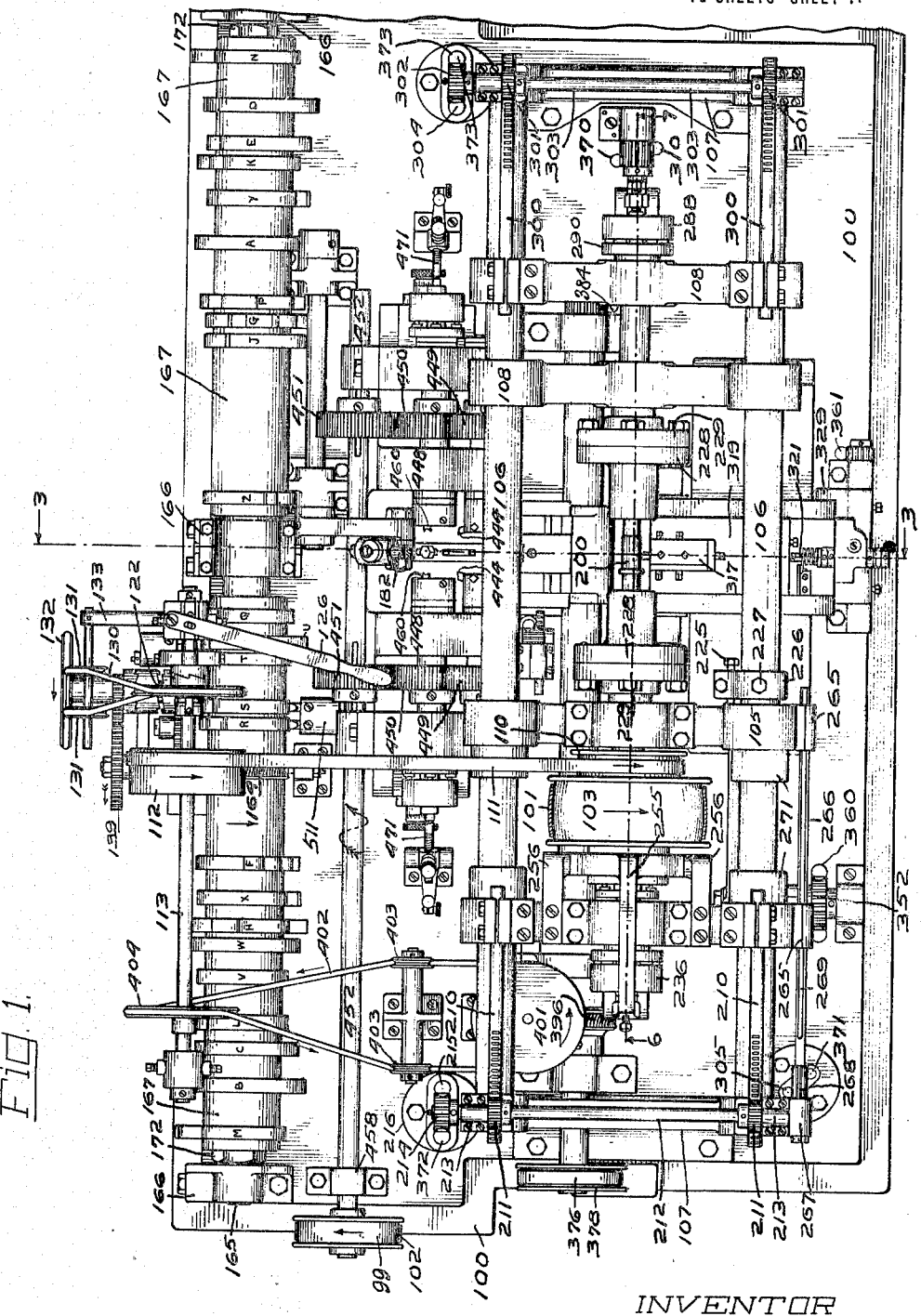

A. F. DONALDSON.
AUTOMATIC MACHINE FOR MAKING CYLINDRICAL METAL PARTS.
APPLICATION FILED NOV. 28, 1916.

1,318,484.

Patented Oct. 14, 1919.
12 SHEETS—SHEET 1.

INVENTOR
Augustus F. Donaldson
by
Owen, Owen & Crampton

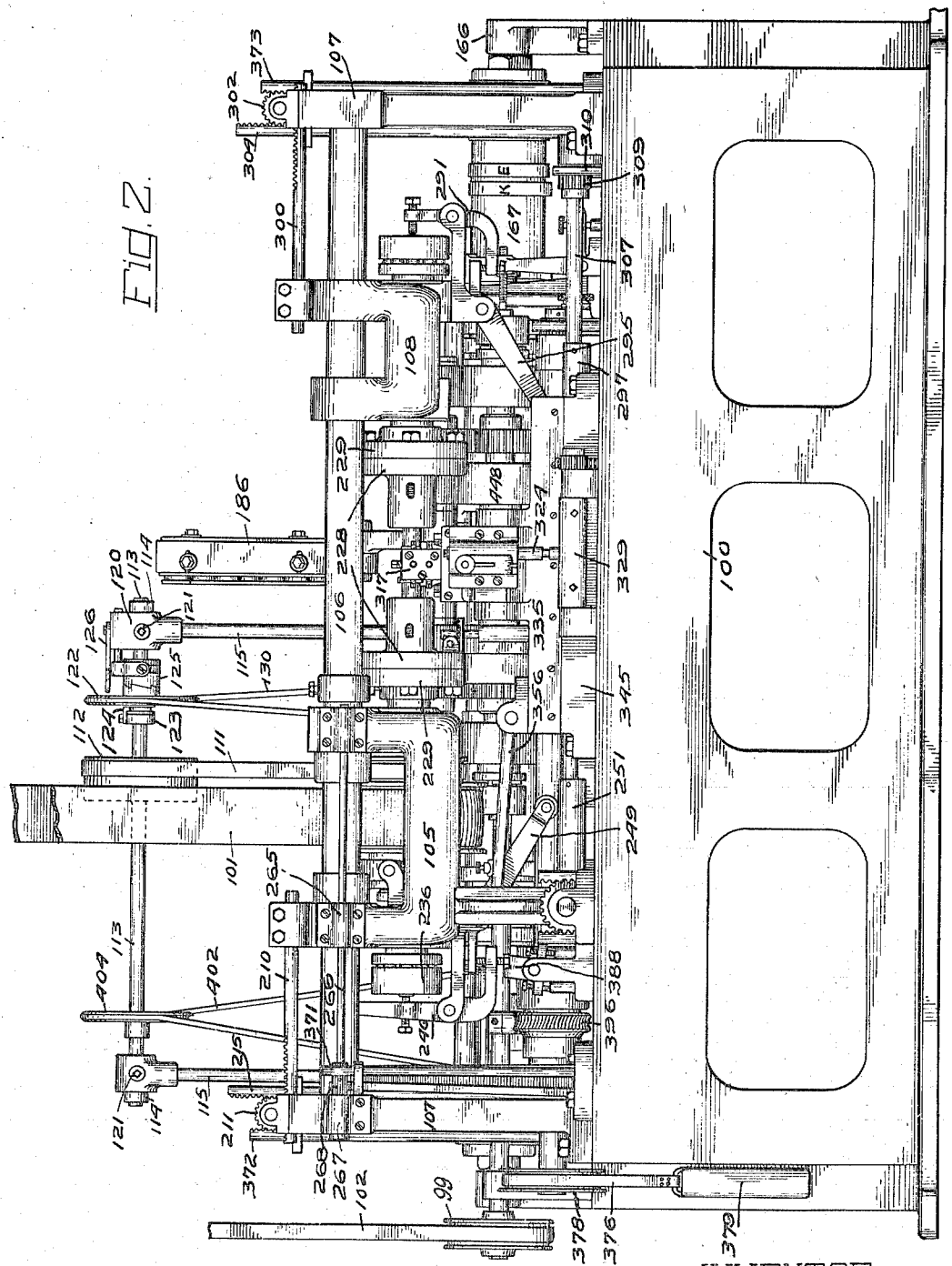

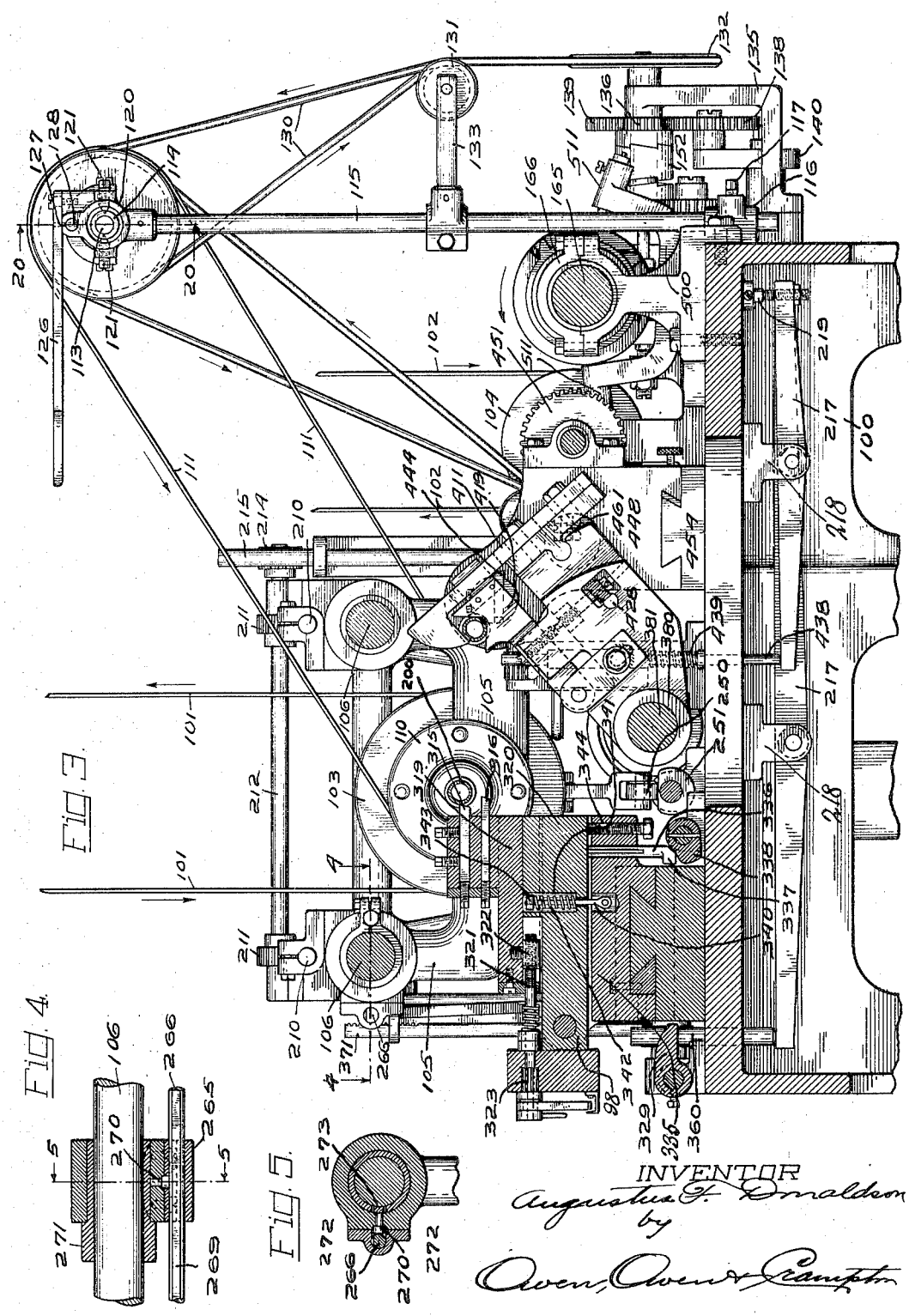

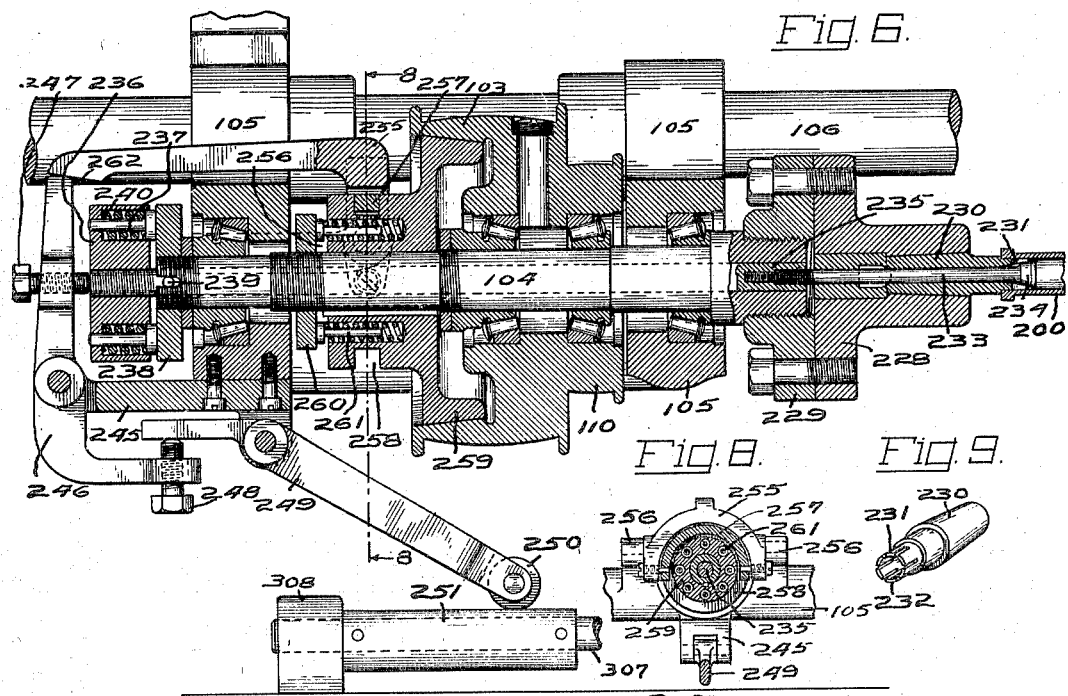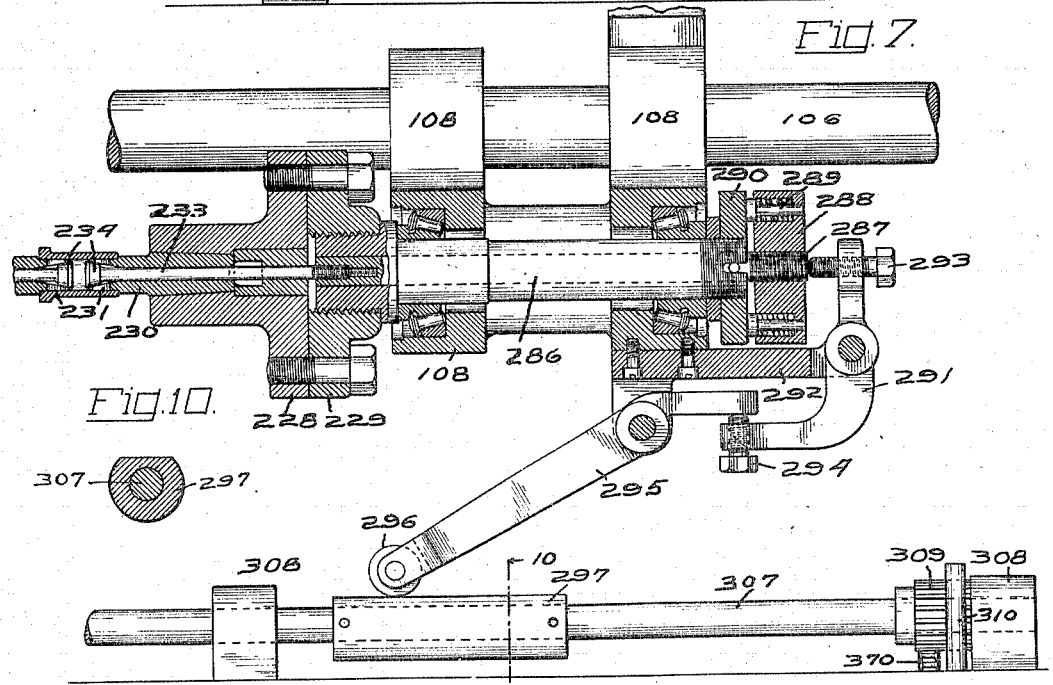

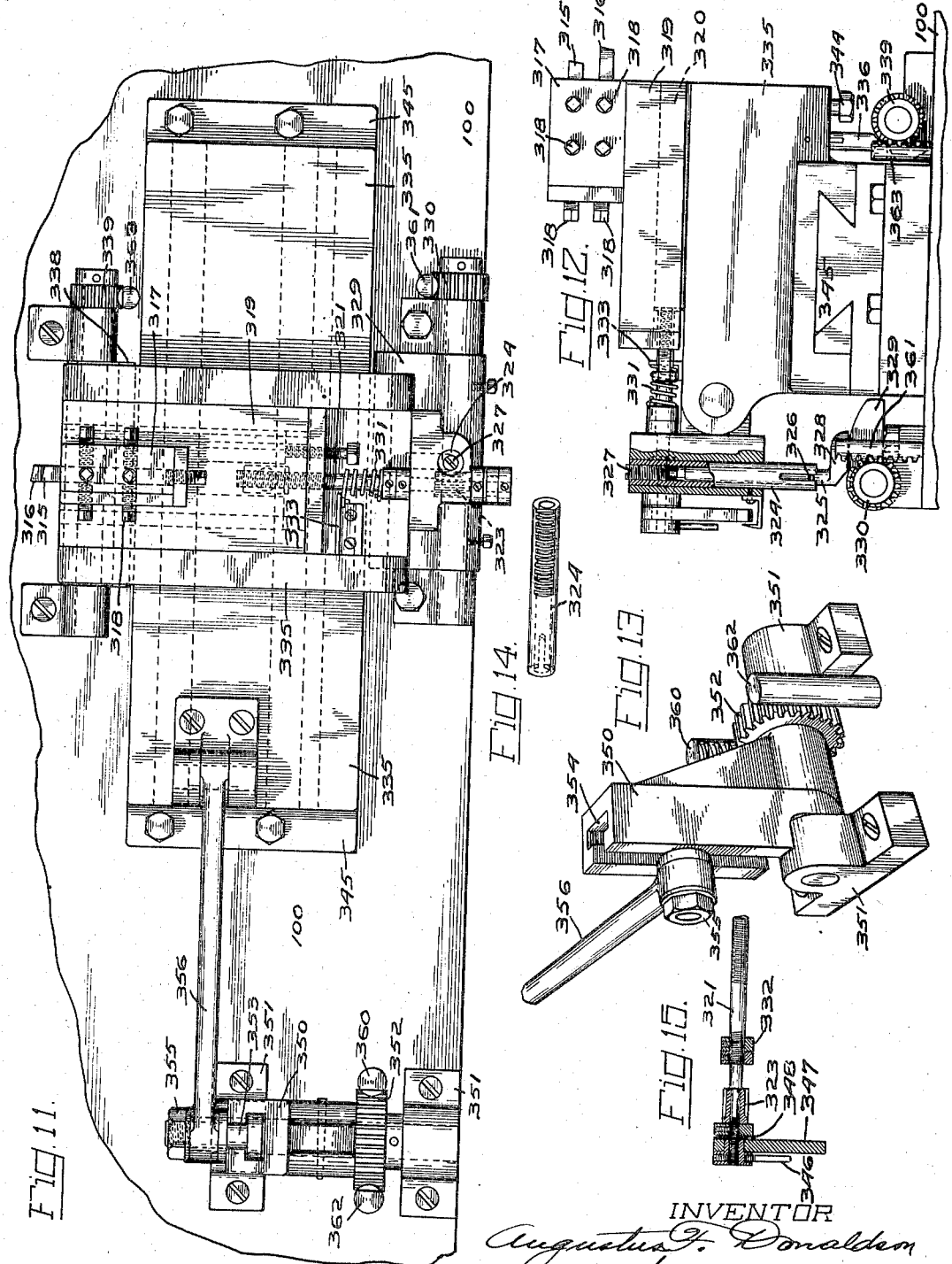

A. F. DONALDSON.
AUTOMATIC MACHINE FOR MAKING CYLINDRICAL METAL PARTS.
APPLICATION FILED NOV. 28, 1916.
1,318,484.
Patented Oct. 14, 1919.
12 SHEETS—SHEET 6.
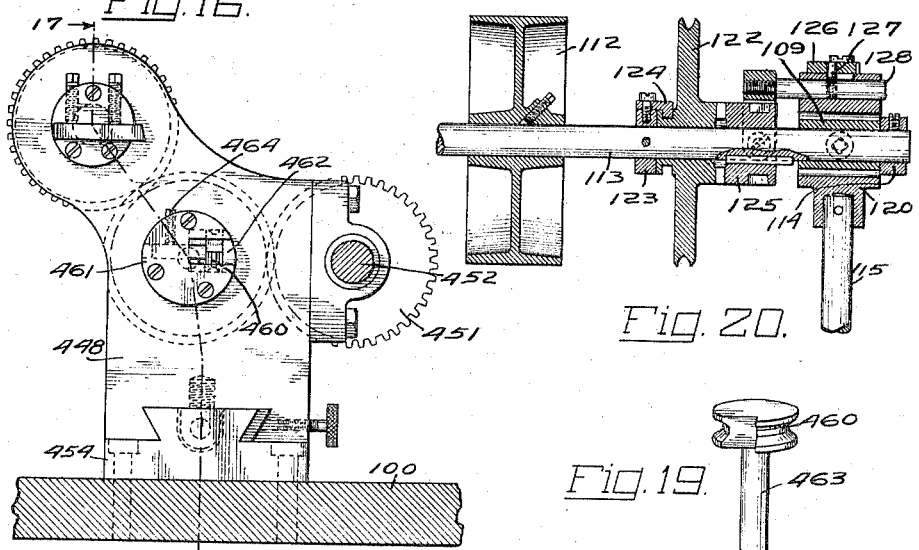
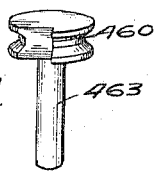
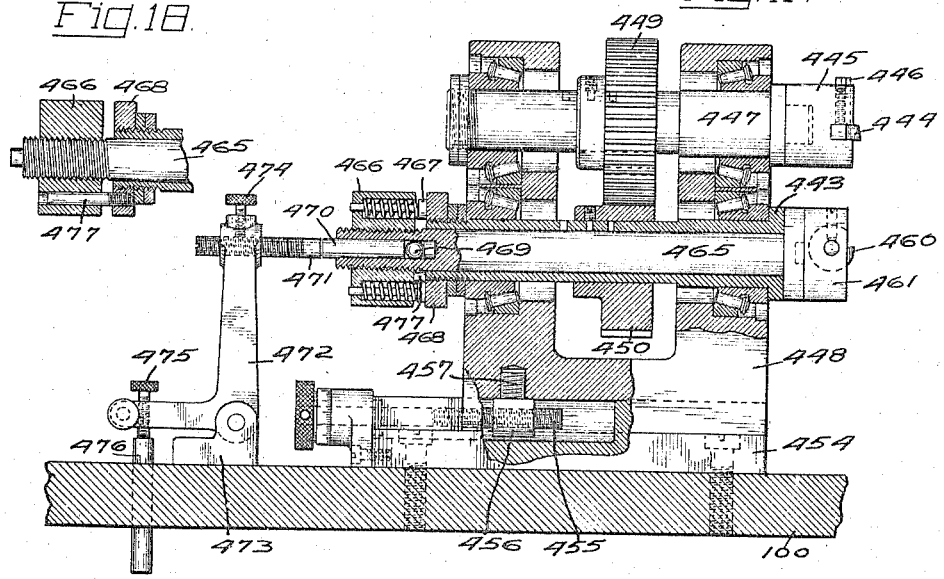
INVENTOR
Augustus F. Donaldson
by
Owen Owen & Crampton A. F. DONALDSON.
AUTOMATIC MACHINE FOR MAKING CYLINDRICAL METAL PARTS.
APPLICATION FILED NOV. 28, 1916.
1,318,484.
Patented Oct. 14, 1919.
12 SHEETS—SHEET 7.
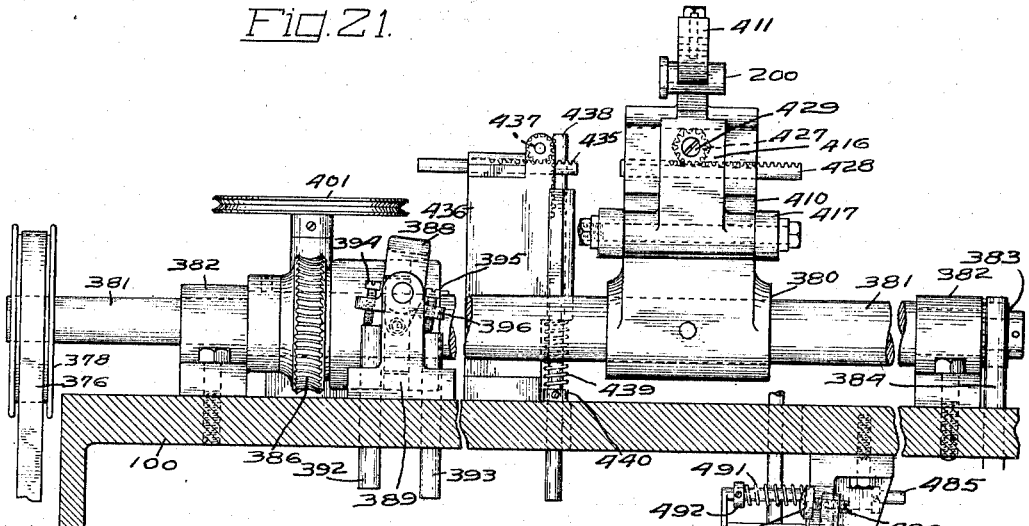
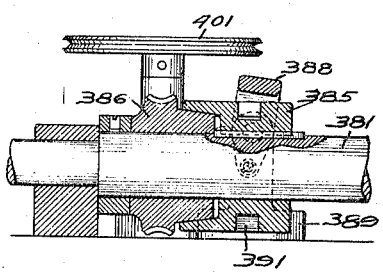
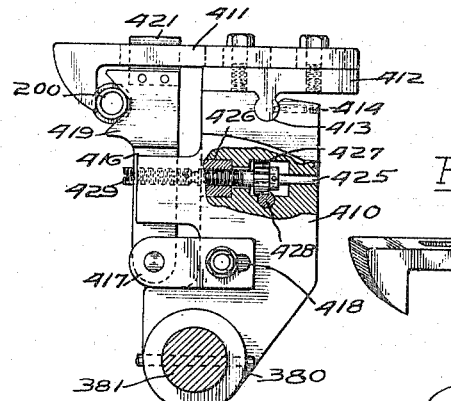
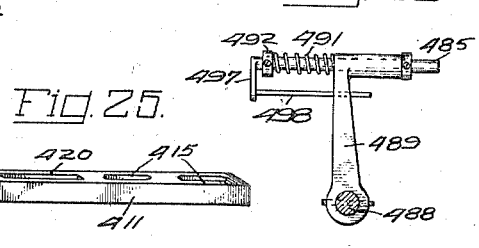

A. F. DONALDSON.
AUTOMATIC MACHINE FOR MAKING CYLINDRICAL METAL PARTS.
APPLICATION FILED NOV. 28, 1916.
1,318,484.
Patented Oct. 14, 1919.
12 SHEETS—SHEET 8.
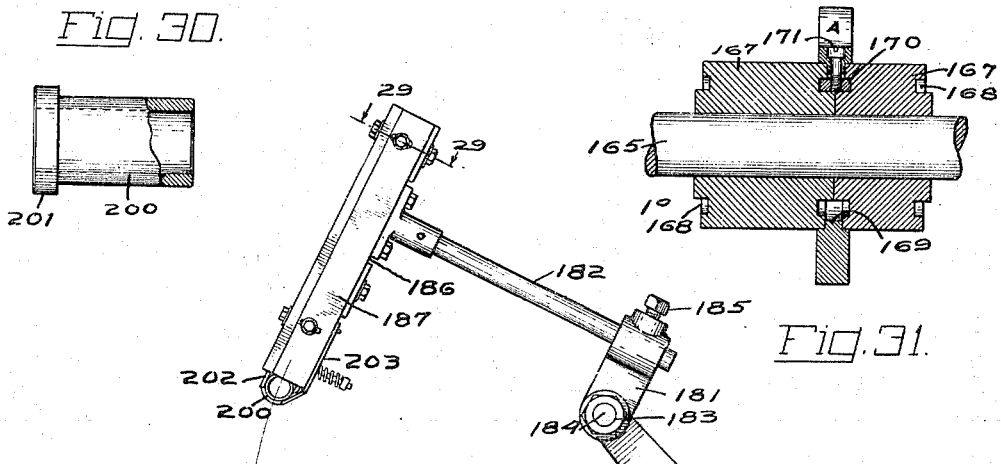
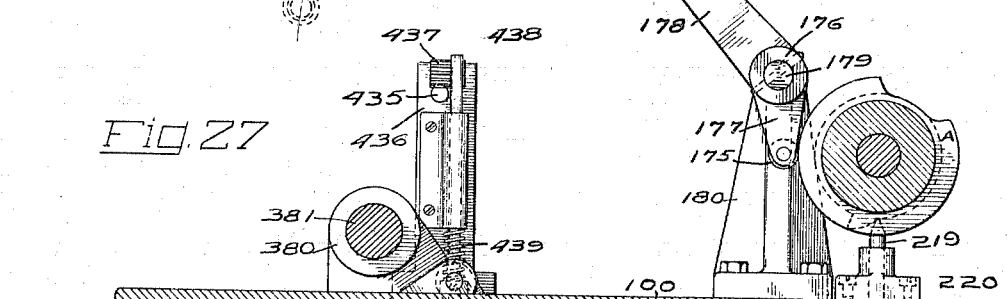
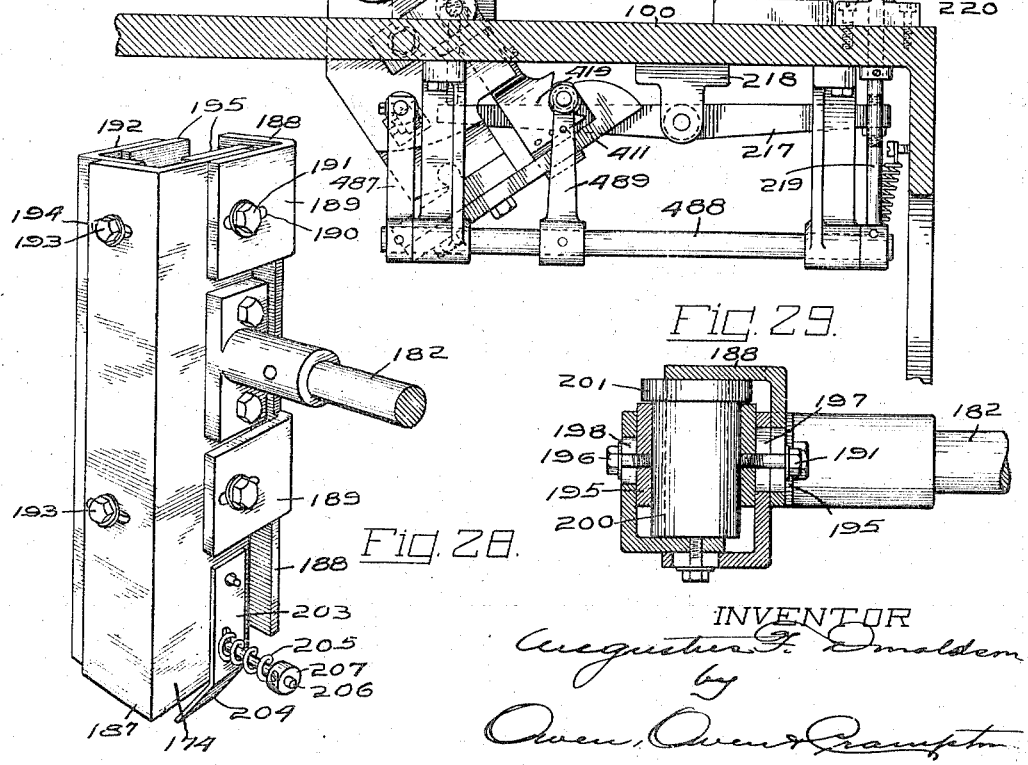
INVENTOR
Augustus F. Donaldson
by
Owen, Owen & Crampton A. F. DONALDSON.
AUTOMATIC MACHINE FOR MAKING CYLINDRICAL METAL PARTS.
APPLICATION FILED NOV. 28, 1916.
1,318,484.
Patented Oct. 14, 1919.
12 SHEETS—SHEET 9.
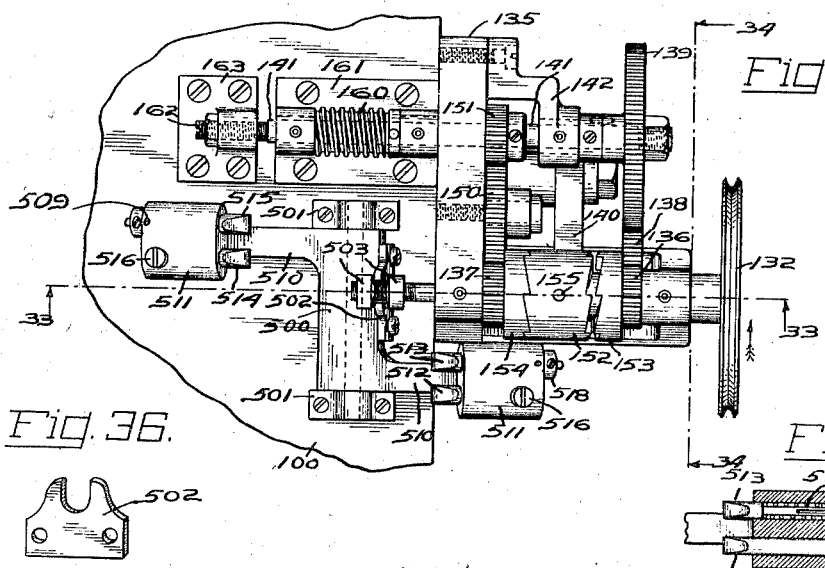
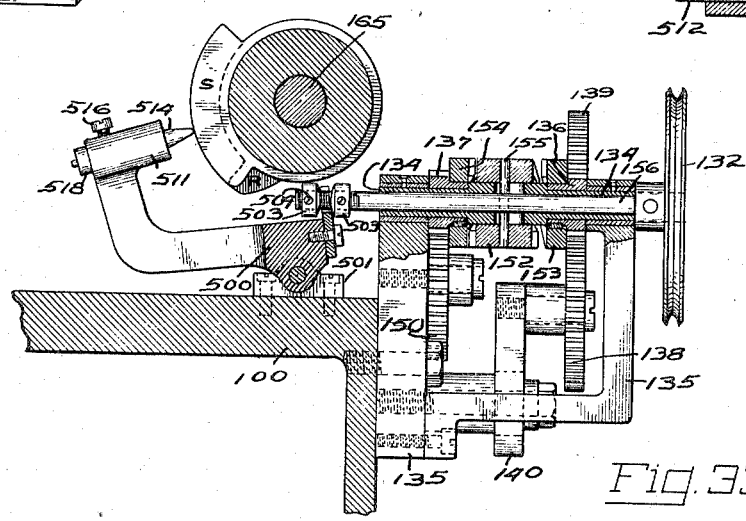
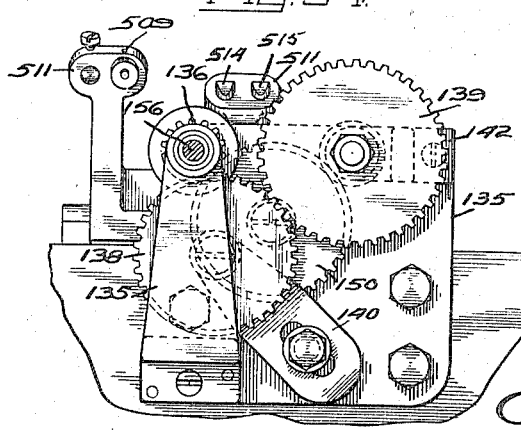
INVENTOR

Fig. 37.

A. F. DONALDSON.
AUTOMATIC MACHINE FOR MAKING CYLINDRICAL METAL PARTS.
APPLICATION FILED NOV. 28, 1916.

1,318,484.

Patented Oct. 14, 1919.
12 SHEETS—SHEET 11.

INVENTOR
Augustus F. Donaldson
by
Owen, Owen & Crampton

A. F. DONALDSON.
AUTOMATIC MACHINE FOR MAKING CYLINDRICAL METAL PARTS.
APPLICATION FILED NOV. 28, 1916.

1,318,484. Patented Oct. 14, 1919.
12 SHEETS—SHEET 12.

INVENTOR
Augustus F Donaldson
by
Owen Owen Crampton

UNITED STATES PATENT OFFICE.

AUGUSTUS F. DONALDSON, OF TOLEDO, OHIO, ASSIGNOR TO THE BUNTING BRASS & BRONZE COMPANY, OF TOLEDO, OHIO, A CORPORATION OF OHIO.

AUTOMATIC MACHINE FOR MAKING CYLINDRICAL METAL PARTS.

1,318,484.     Specification of Letters Patent.     Patented Oct. 14, 1919.

Application filed November 28, 1916. Serial No. 133,970.

*To all whom it may concern:*

Be it known that I, AUGUSTUS F. DONALDSON, a citizen of the United States, and a resident of Toledo, in the county of Lucas and State of Ohio, have invented a certain new and useful Automatic Machine for Making Cylindrical Metal Parts; and I do hereby declare the following to be a full, clear, and exact description of the invention, such as will enable others skilled in the art to make and use the same, reference being had to the accompanying drawings, and to the characters of reference marked thereon, which form a part of this specification.

My invention relates to automatic machines for turning the outside and finishing ends of cylinders. It has for its object to produce a machine wherein the cylinders are finished after the same have been cast or otherwise roughly formed. The cylinders are placed in a magazine, whereupon the machine will take the cylinders from the magazine, rough cut and finish cut the exterior, cut the ends of the cylinders, chamfer the corners and deliver the cylinders from the machine.

A particular object of the invention is to provide a machine which may be readily adjusted in order that different size cylinders, cylinders with or without flanges, cylinders having a flange at one end only, and cylinders having flanges at both ends, may be made.

A further object of my invention is to provide a means whereby the elements of the machine performing certain functions may be relatively speeded up during times that the machine performs steps which permit of such speeding up of the machine, and which will cause the machine to return to normal speed during such times that functions performed by the machine should be performed while the machine is moving at a lower speed.

A further object of my invention is to produce a machine having operated and driving parts of a uniform character whereby the machine is rendered as simple as may be and is constructed of like parts, and thus the number of unlike parts is greatly diminished.

A further object is to provide a machine for making roller cylinders which is efficient and durable, and yet may be made and may be maintained at a low cost.

The invention may be contained in many forms of construction usable for different purposes, all of which come within the purview of my claims hereinafter appended. To show the practicability of my invention I have selected a construction containing the invention as an example and shall describe it hereinafter. The construction selected is illustrated in the accompanying drawings.

Figure 1 of the drawings illustrates a top view of the machine having one or more parts removed for purposes of illustration, but which parts are shown in other views of the drawings. Fig. 2 is a side view of the machine. Fig. 3 is a transverse sectional view taken on the line 3—3 indicated in Fig. 1. Fig. 4 is a detailed sectional view of the head stock binder taken on the line 4—4 indicated in Fig. 3. Fig. 5 is a sectional view taken on the line 5—5 in Fig. 4. Figs. 6 and 7 are sectional views of the head and tail stocks taken on the line 6—7 indicated in Fig. 1. Fig. 8 is a reduced sectional view of a clutch taken on the line 8—8, indicated in Fig. 6. Fig. 9 is a perspective view of a chuck for engaging the bearings. Fig. 10 is a sectional view of a cam taken on the line 10—10 shown in Fig. 7. Fig. 11 is a top view of a tool carrier. Fig. 12 is an end view of the tool carrier. It particularly illustrates mechanism used for raising and shifting the tool carrier. Fig. 13 is a perspective view of a means for moving the tool carrier. Fig. 14 is a perspective view of a rack shown in Fig. 12. Fig. 15 is a view partly in section showing a threaded means for shifting the tool carrier. Fig. 16 is an end view of mechanism for surfacing and chamfering the ends of the cylinder. Fig. 17 is a longitudinal sectional view of the mechanism shown in Fig. 16 taken on the line 17—17 indicated in Fig. 16. Fig. 18 is a sectional view of part of the mechanism for operating the chamfering tool shown in Fig. 17. Fig. 19 is a perspective view of the chamfering cutting tool. Fig. 20 is a sectional view taken on the line 20—20 indicated in Fig. 3 showing a mechanism for connecting and disconnecting a pulley drive for a part of the machine. Fig. 21 illustrates a rapid transit work carrier and a clutch means for connecting it to a driving means. Fig. 22 is an end view of the clutch. Fig. 23 is a sectional view of the clutch taken on the line 23—23 indicated in Fig. 22. Fig. 24 is a side view of the carrier. Fig. 25 is a perspective view of an engaging hook or latch for engaging the work. Fig. 26 illustrates a means for removing the work from the carrier. Fig. 27 illustrates the magazine and the carrier showing their relative positions. Fig. 28 is a perspective view of the magazine. Fig. 29 is a sectional view of the magazine showing one of the hollow cylinders contained therein. Fig. 30 is a side view of a hollow cylinder; the adjustment of the particular machine shown being for the making of a cylinder having a flange on one end as shown in Fig. 30. Fig. 31 illustrates a sectional view of one of the cams for operating a part of the mechanism and shows particularly the means for securing the cams on the cam shaft. Fig. 32 is a top view of a gear shift mechanism for causing the machine to automatically change its speed. Fig. 33 is a sectional view taken on the line 33—33 indicated in Fig. 32. Fig. 34 is a rear view of the mechanism shown in Fig. 32, a section being taken on the line 34—34 indicated in Fig. 32. Fig. 35 is a sectional view of a head for locking clutch parts also shown in Fig. 32. Fig. 36 is a claw for engaging the shoulders on a rod connected to the clutch shown in Figs. 32 and 33. Fig. 37 is a tubular arrangement of the sequential operations of the machine. Figs. 38 to 61 illustrate the cams that control the operations of the machine, the angular periods of idleness and operation of the cams being indicated in connection therewith.

100 of the drawings indicates the base or bed on which the parts of the mechanism are supported. It is provided with suitable bearings and upright brackets for supporting the shafts and other parts of the mechanism. The drive is supplied with belts 101 and 102, which move over the pulleys 103 and 99. The main drive is supplied through the belt 101, which operates on the pulley 103. The pulley wheel 103 is supported on a shaft 104 (Fig. 6) on which it loosely rotates.

The shaft 104 is supported in a depending head stock 105 which is supported on rods 106. The rods 106 are supported on upstanding brackets 107 located at the ends of the base or bed 100. Intermediate the pulley wheel 103 and the shaft 104, and intermediate the shaft 104 and the supporting head stock 105 are suitable roller bearings to reduce friction between the moving parts. A pulley wheel 110 is secured to or forms a part of the hub of the pulley wheel 103. A belt 111 connects the pulley wheel 110 with the pulley wheel 112. The pulley wheel 112 is supported on a shaft 113. The shaft 113 is supported in adjustable bearings 109 located at the ends of the shaft 113. Adjustable collars 114 secure the shaft 113 in position in the bearings 109. The adjustable bearings 109 are supported on the upper ends of the rods 115 which are adjustably connected to the base 100 by means of the brackets 116 in which the rods 115 are clamped by means of the bolts 117. The bearings 109 are adjustably secured in housings having screws 121 which support the bearings centrally with respect to the housings. The bearings 109 may be shifted laterally by proper adjustment of the screws 121. The screws 121 provide a means for taking up any slack in the belts which connect with pulleys that are located on the shaft 113.

A pulley wheel 122 is mounted on the shaft 113 for free rotation with respect to the shaft. It is secured in position on the shaft from movements along the shaft by means of the ring 123 which is keyed to the shaft and the engaging lug 124, which extends into a groove formed in the hub of the pulley 122. A clutch 125 is keyed to the shaft 113 and may be shifted by means of the lever 126 to connect the pulley 122 with the shaft 113. The lever 126 is pivotally supported on the housing 120. It has a pin 127 (Fig. 20) which is threaded into a pin 128 supported in the housing 120 for longitudinal movements of the pin. The pin 128 is threaded into a lug or ear formed on the clutch 125. When the lever is shifted in one direction the clutch 125 is thrown into engagement with the pulley 122 and when moved in the opposite direction disconnection is made between the clutch and the pulley.

The belt 130 runs over the pulley wheel 122 and a pair of idle pulley wheels 131 and the pulley wheel 132. The pulley wheels 131 are supported on a bracket formed of a pair of rods 133 which are secured to one of the upstanding rods 115. The pulley 132 is keyed to a sleeve 134 (Fig. 33) which is supported in a bracket 135 that is fastened to the base 100. A pinion 136 and a pinion 137 slip on the sleeve 134. The pinion 136 operates on an idler 138 which in turn operates on a gear wheel 139. The idler 138 is supported in a bracket 140 secured to the bracket 135 and to the base 100, while the gear wheel 139 is keyed to a shaft 141, which is supported in a bracket 142.

The pulley wheel 132 is also connected through gears to the shaft 141 for causing the shaft 141 to rotate at a higher speed. The pinion 137 which is located on the sleeve 134 for free rotation meshes with an idler 150 which is secured to the bracket 135. The idler 150 meshes with the pinion 151 which is also keyed to the shaft 141.

Either set of gears may be connected with the pulley wheel 132 by means of the clutch 130 member 152 which operates between clutch engaging members 153, 154, which are connected to the pinions 136 and 137, respectively. The clutch member 152 is movable on the sleeve 134. It is provided with a pin 155 which extends through the clutch member 152 and a rod 156. The rod 156 is supported within the sleeve 134 and is movable along the sleeve. It is shifted by mechanism hereinafter described to vary the speed of rotation of the shaft 141.

The shaft 141 is keyed to a worm 160. The worm 160 is supported in bearings located in a bracket 161 secured to the base 100. A screw 162 is threaded into a bracket 163 which is also secured to the base 100. The screw 162 presses against the end of the shaft 141 to which the worm 160 is keyed to take up the end thrust of the shaft.

The worm 160 operates upon the worm wheel 164 (Fig. 1) which is located on the shaft 165 supported in brackets 166 located at opposite ends of the base 100. On the shaft 165 is supported a plurality of cams indicated by the capital letters marked on Fig. 1 of the drawings. The cams operate and time the different parts of the machine in order that the functions of the machine may be properly performed. They are all secured to the shaft 165 in their proper inter-relation in order that each sequential operation of the machine may be performed in its proper time. The cams are illustrated in Figs. 38 to 61 inclusive. The Figs. 38 to 61 show the cams in the same position on the shaft 165 in which they are shown in Fig. 1 of the drawing.

The cams are spaced apart by means of blocks 167. In the ends of the blocks 167 are cut channels 168 while the outer walls of the channels 168 are cut down so that when the blocks 167 are placed end to end T-shaped channels are formed between the blocks. The cams surround the outer edges of the ends of the blocks. The cams are provided with an inwardly extending ridge 169 which is located between the ends of two adjoining blocks 167 and between the edges of the outer walls of the channels 168. Square nuts or blocks 170 are inserted in the T-shaped channels. They are located in the transverse portions of the T-shaped channels. Screws 171 pass through depressed portions of the cams and thread into the nuts 170, to tightly secure the cams in their proper inter-related positions. The blocks 167 are clamped together on the shaft 165 by means of the nuts 172 which are located at opposite ends of the shaft 165. Cams may thus be readily shifted or substituted to produce variable movements of the mechanisms. The square nuts 170 and the screws 171 located in the channels formed between the ends of the blocks afford a means for readily adjusting the cams on the shaft to time the different mechanisms operated thereby and to make proper allowance, for wear or lag, or to advance the operations of the mechanisms as may be desired.

The cam A operates the magazine in which the cylinders in rough are located. As shown in Fig. 27, the cam A operates on the roller 175 which is located on the end of a lever 176. The lever 176 is of a bell crank form comprising the arms 177 and 178, which are keyed to a shaft 179. The shaft 179 is supported on upstanding brackets or standards 180 which are secured to the base 100. The upper end of the lever 178 is provided with a bracket 181 in which is located a rod 182. The bracket 181 may be angularly adjusted with reference to the arm 178 by means of the nuts 183 and a threaded pin 184, which extends through the bracket 181 and the arm 178. The rod 182 is also adjusted with respect to the bracket 181 and secured in its adjusted position by means of the screw 185. The magazine 186 is secured to the outer end of the rod 182. The magazine 186 is provided with adjustable walls for bearings of different sizes. The rod 182 is secured to the rear and side walls 174, 187. The side wall 188 is provided with tongues 189 having slots 190 through which bolts 191 extend and are threaded into the rear wall 174 to clamp the wall 188 in its adjusted position relative to rear wall 174. A front wall 192 is provided with bolts 193 which extend through slots 194 located in the side wall 187. By this means the front wall 192 may be adjusted relative to the rear wall 172. Strips 195 are located within the hopper 186 and are secured in position by means of the bolts 191 and bolts 196, which extend through slots 197 and 198 located in the rear and front walls, respectively. The strips 195 form a spacing means to hold the cylinder 200 in position. This is particularly of value when the cylinders 200 are provided with flanges. The flanges engage with the edges of the strips 195 and the side wall 188 or walls 187 and 188, and thus keep the axes of the cylinders in transverse positions in the magazine as they move vertically downward through the magazine. The machine is provided with the necessary cams and is adjusted to finish cylinders having flanges 201 located at one end of the cylinders 200. The strips 195 thus guide the cylinders 200 as they pass through the hopper and hold the bearings in proper positions as they pass down through the hopper and prevent them from interlocking by reason of the flanges and any angular turning of the cylinders within the magazine. The lower end of the magazine is provided with a spring 202 which is secured to the front wall 192 of the magazine. It is also provided with a spring 203 which is secured to the rear wall 174 of the magazine. The spring 203 is provided with the lip 204 which extends forward and beneath the lower end of the magazine. In order that the spring 203 may have free yielding movements it may be pressed in position against the rear wall 172 of the magazine by means of a spring 205 which is located on a pin 206 and intermediate a collar 207 which is secured to the pin 206 and the spring 203. The cam A is provided with a depressed portion which permits the magazine 186 to drop into such a position that the cylinder located between the springs 202 and 203 may be engaged by the head and tail stock of the machine.

The head stock 105 is connected to a pair of racks 210. Pinions 211 are keyed to a shaft 212 which is supported in bearings 213 secured to brackets 107. The pinions 211 operate on the racks 210. A pinion 214 is also keyed to the shaft 212. The pinion 214 meshes with the rack 215 which is supported in the bearing 216 secured to the base 100.

A plurality of racks extend up through the base 100 and operate on pinions in a similar manner that the rack 215 operates on the pinion 214. They are operated by levers 217 which are pivotally supported in brackets 218 secured to the under side of the base 100. The levers are operated by pins 219 which extend upward through bearings 220 secured on the top of the base 100. The ends of the pins 219 are operated upon by the cams located on the shaft 165. They are depressed by the cams and they are raised positively by other racks and cams operating on the mechanism, or by a weight or a spring.

The rack 215 is connected to the cam B through a lever 217 and a pin 219. The cam B operates to lift the rack 215 at the proper time, namely, when the magazine has been brought down by the operation of the cam A so as to bring the lowermost cylinder in line with the axis of the head stock. When the rack 215 is raised the rack 210 is pushed forward, which moves forward the head stock until it strikes the threaded pin 225 which is threaded into a collar 226 which may be adjustably secured by means of a bolt 227 on one of the rods 106. The head and tail stocks are provided with centering pins 230 which enter the lowermost cylinder 200 contained in the magazine just before the head stock strikes the stop screw 225. The centering pin 230 of each stock is also provided with a chuck, it having a locking portion 231 located at the end of the pin. The locking portion of the centering pin has a plurality of tongues 232. A central opening of the centering pin 230 is conical and a pin 233 extends through the centering pin and is provided with a conical head 234. The conical head 234 operates to spread the tongues 232 when the pin 233 is pulled inwardly relative to the centering pin 230 to securely fasten the bearing 200 to the centernig pin 230. The centering pin 230 is located in a bossed collar 228 which is bolted to a collar 229 threaded on the shaft of each stock. This facilitates truing the chucks.

The pin 233 is connected to a rod 235 which extends through the shaft 104 of the head stock. It has a head 236 which is threaded onto the rod 235. The head 236 is provided with sockets in which are located spring pressed pins 237. The pins 237 press against a collar 238 threaded onto the shaft 104. A pin 239 which moves in a notch or slot formed in the end of the shaft 104 keys the rod 235 to the shaft 104. The bracket 245 is secured to the head stock 105 and supports a lever 246 having a bolt 247 which presses against the end of the rod 235 to force the rod 235 inward against the operation of the springs which press the pins 237 outward against the collar 238. The lever 246 is also provided with an adjustable pin or bolt 248 which presses against one arm of a lever 249 also pivotally supported on the bracket 245. The lever 249 is provided with a roller 250 which rides on a cylinder 251 having a cam surface. When the cylinder 251 is rotated to a certain position the roller 250 is raised and by releasing the lever 246 and allowing the springs 240 to pull the rod 235 and consequently the pin 233 along the shaft 104, and thus the conical head 235, spreads the tongues 232, and thus secures the bearing 200 in position on the centering pin or clutch 230, The end of the lever 246 operates on the end of a lever 255 which is pivotally supported on brackets 256 to the head stock 105. The lever 255 is provided with a yoke having inwardly extending pins which engage a slip ring 257 that is located in a channel 258 formed in a clutch member 259 slip-keyed to the shaft 104 after the manner well known in the art. A collar 260 is threaded onto the shaft 104 and spring-pressed pins 261 press against the collar 260 to push the clutch member 259 along the shaft so as to engage with the pulley wheel 103, whereby the pulley wheel 103 is connected to the shaft 104 to cause rotation of the shaft 104. When the lever 246 is allowed to move by the operation of the springs 240 its upper end moves along an inclined surface 262 to allow the lever 255 to be depressed by the spring-pressed pins 261 and to permit the clutch member 259 to connect the pulley wheel 103 with the shaft 104. When the roller 250 is raised by the cam cylinder 251 the chucks are secured to the cylinder 200 and immediately connection is made between the driving shaft 104 and the pulley 103 to cause rotation of the cylinder 200.

Means is provided for locking the head stock. The head stock is provided with ears 265 through which a rod 266 extends. The rod 266 is secured in a bearing 267 secured to the bracket 107. The rod 266 is provided with a pinion 268 to which it is keyed for the purpose of rotating the rod 266. The rod 266 is flattened on one side 269 while the ears 265 are provided with pins 270 which move inwardly toward the bearings of the head stock on one of the rods 106 (Fig. 5). The bearings 271 have each two saw cuts 272 leaving an intermediate flexible portion against which each pin 270 may be pressed by the rod 266 when the rod 266 is turned so as to turn its flattened portion away from the head of the pin 270. The flexible portion 273 of the bearings 271 are thus pressed against the rods 106 and the head stock is locked in position and is ready to receive the pressure of the tail stock on the work.

The tail stock 108, which is also supported on the rods 106, is constructed somewhat similar to the head stock. The pin 233 of the tail stock is connected to a rod 287 which extends through the shaft 286 and is movable longitudinally along the shaft 286 to move the head 234. The rod 287 is also provided with a head 288, which is pushed outward by spring-pressed pins 289 which are pressed against a collar 290 threaded onto the shaft 286. A lever 291 is pivotally supported in a bracket 292 which is secured to the tail stock 108. It is provided with a threaded pin 293 which presses against the end of the rod 287 to force the rod inward against the operation of the spring-pressed pins 289. The opposite end of the lever 291 is provided with a threaded pin or screw 294 and a lever 295, also pivoted to the bracket 292 operates, through the pin 294, the lever 291. The lever 295 is provided with a roller 296 which rides upon a cam cylinder 297 so that when the cam 297 is turned to raise the roller 296 the pin 293 will press the rod 287 which pushes the head 234 on the pin 233 inward relative to the bearing 200 and thus the cylinder is released from the chuck, and when the roller 296 is lowered the spring-pressed pins 289 pull the rod 287 outward to cause the chuck to engage with the cylinder 200.

The tail stock 108 is shifted forward to engage with the cylinder 200 by means of the racks 300 which are secured to the tail stock. Pinions 301 and 302 are keyed to the shaft 303 which is supported in the bracket 107. The pinion 302 is operated on by the rack 304 which is operated by the cam D operating through a pin 219 and a lever 217. When the head stock has been pushed up against the pin 225 by the cam B operating on the racks 215 and 210, the head stock is locked in its position by the operation of the cam C which is connected by a pin 219 and a lever 217 with the rack 305, which operates on the pinion 268 located on the binder rod 266, which forces the pins 270 against the yielding portion 273 of the bearing 271 to securely fasten and bind the head stock 105 to one of the rods 106. The tail stock is then pushed up by the operation of the cam D upon the rack 304 and the racks 300, which causes the tail chuck to enter the bearing 200. The cylinder is then locked by the chucks by the operation of the cams 251 and 297. The cams 251 and 297 are connected to a shaft 307 which is supported in brackets 308 secured to the base 100. A pinion 309 is keyed to the shaft 307 and is rotated by the rack 310 which is operated by the cam E through a lever 217 and a pin 219 to cause rotation of the cams 251 and 297, which permit the rollers 250 and 296 to drop and allow the pins 233 to be drawn outward. At the same time the lever 255 allows the clutch member 259 to engage with the pulley 103 and thus connect the shaft 104 with the pulley 103, which causes rotation of the cylinder 200.

The cylinder is now roughly finished by means of a cutting tool located in a movable tool carrier which directs the tool along the cylinder and across its flange. Means is also provided for causing the return of the tool carrier, and for raising the tools to permit the finishing tool to again operate upon the cylinder to make the finishing cut, while the carrier is again being fed forward along the cylinder and across the flange. The tools 315 and 316 are secured in a housing 317 by means of machine bolts 318 suitably disposed for securely fastening the tools in position. The housing 317 is secured to or forms a part of a block 319. The block 319 is movable along the block 320 and transversely with respect to the axes of the stocks and the cylinder 200. The block 319 is shifted relative to the block 320 by means of the threaded rod 321 extending through a lug formed on the block 319 and through the threaded head of a pin 322 secured to the under side of the block 319. The rod 321 is provided with a pinion 323 which is located in a head attached to or forming a part of the block 320. The pinion may be keyed to the rod by a suitable keybolt. The rack 324 operates upon the pinion 323 to rotate the rod 321 and to shift the block 319. The rack 324 is formed on a sleeve into which a rod 325 extends. The rod 325 is slip-keyed to the rack 324 by means of the pin 326 which extends through a slot formed in the lower end of the sleeve rack 324. The upper end of the sleeve 324 is provided with a stop pin 327 to adjust the movements of the rack relative to the rod 325. The rod 325 is provided with a foot 328 which is operated upon by the cam 329 to raise the rod 325 a short distance and then to raise the rack 324 to cause rotation of the rod 321 and consequently to cause the tool carrier to be drawn away from the work. A pinion 330 is connected to the cam 329 and when rotated lifts the rod 325 and the rack 324. A spring 331 causes a return of the rod and of the tool carrier when the cam 329 is lowered. One end of the spring 331 is connected to a collar 332 adjustably secured to the rod and the other end is secured to a bracket 333. The rod 321 may be micrometrically adjusted when the pinion 323 is unkeyed by turning the arm 346 which is keyed to the rod 321. A scale 347 slips on a bushing of the arm 346 and is frictionally held to the pinion by the spring washer 348, which prevents rotation of the scale member when the arm 346 is rotated, and thus relative movements of the arm 346 may be indicated.

The block 320 is pivoted to the block 335. One end of the block 320 is lifted by the rod 336 which is slip-keyed to the block 335 and is movable through an over-extending ledge of the block 335 by the pin 98. It is provided with a foot 337 on which a cam 338 operates to push the pin 336 upward and consequently to raise the block 320 when the cam 338 is turned. The cam 338 is connected to a pinion 339 for rotating the cam 338 to lift the block 320 and the housing 317, which contain the tools 315 and 316. The block 335 is provided with a dove-tailed slot which feeds over the dove-tailed runner or guide 345, which is secured to the base 100 so that the block 335 may be shifted along the base 100 when the tools 315 and 316 are moved along the cylinders 200 and when they are returned to their initial positions.

A rod 340 is pivoted to the block 335 and the block 320 is provided with a socket 341 into which the rod 340 extends. A spring 342 is located in the socket 341 and is located intermediate the bottom of the socket and the nut 343. The spring 342 operates to press the rod 336 downward against the cam 338. An adjustable stop pin 344 operates to limit the downward movement of the block 320.

The block 335 is fed along the base 100 by means of a pivoted channel member 350 which is supported in bearings 351 secured to the base 100. The channel member 350 is keyed to the pinion 352. A pin 353 having a head movable along the T-channel 354 formed in the channel member 350 is secured in position by means of the nut 355. The nut 355 also pivotally secures the pin 353 to a link or whip rod 356 which is connected to the block 335 and moves it along the guide member 345 as the channel member 350 is swung back and forth.

When the cylinder 200 is secured in position and while it is rotated by the operation of the pulley wheel 103, the cutting tool 315 is moved or fed longitudinally with respect to the cylinder, which rough cuts the exterior surface of the cylinder. In so doing the pinion 352 is moved by the rack 360 which is operated by the cam F operating through a pin 219 and a lever 217, which rotates the channel member 350 and causes the link 356 to pull the block 335 until the cutting tool 315 reaches the flange of the cylinder 200. The cam F then holds the rack 360 for a period of time while the block 319 is pulled transverse the block 335, that is, while the rod 321 is rotated by the operation of the cam 329 which lifts the rack 324. The cam 329 is rotated by means of the cam G which operates on the rack 361 through a pin 219 and a lever 217. The block 317 is pulled away from the work until the rough cutting tool is in line with the rough cut of the flange, whereupon the cam F causes the rack 360 and pinion 352 to move the block 335 farther along the base 100 to complete the rough cut of the flange. The block 335 is then returned and at the same time the block 319 is lifted. The block 335 is returned by the operation of the rack 362 which is operated by the cam H operating through a pin 219 and a lever 217, which also causes the return of the rack 360. The cutters are raised by raising the block 335. The block 335 is raised by the cam J operating on the rack 363 through a pin 219 and a lever 217, which rotates the pinion 339 and causes the cam 338 to push the pin 336 upward against the tension of the spring 342. This brings the cutting tool 316, which is the finishing tool, in line with the finishing cut of the cylinder, whereupon the rack 360 is again operated by the cam F to again draw the block 335 along the base 100, stopping when the cutting tool 316 reaches the flange of the cylinder during the operation of the cam G which operates on the rack 361 to withdraw the block 319 and consequently the tool 316 until the cutting tool 316 is in line with the finishing cut of the flange of the cylinder, whereupon the cam F operating through the rack 360 pulls the block 335 farther along the base 100 to complete the finishing cut of the flange. The block 335 is then returned, as before, and the block 319 is shifted along the block 335 by the operation of the spring 331 which turns the rod 321. Also, the blocks 319 and 335 are lowered by the return of the cam 338 and the pull of the spring 342, which brings the rough cutting tool 315 in line for the rough cut of the next cylinder 200.

The chucks are then released by the operation of the cam K operating upon the rack 370 through a pin 219 and a lever 217. The rack 370 operates upon the pinion 309 which causes rotation of the cams 251 and 297 to lift the rollers 250 and 296 which press the rods 235 and 287 to move the heads 234 inward with respect to the cylinder 200. The cylinder is thus released and rests upon the centering pins or chucks 230. At the same time the binder which locks the head stock is unlocked by the operation of the cam L which lifts the rack 371 and causes the return of the rack 305 and rotates the rod 266 so as to bring the flattened portion 269 into juxtaposition to the head of the pin 270, which releases the flexible portion of the bearing 271. The head stock 105 is then opened, that is, removed from the cylinder 200, by the operation of the cam M operating on the rack 372, which also causes the return of the rack 215. The rack 372 rotates the pinion 214 and the pinions 211, which pull the racks 210 and draw the head stock 105 away from the cylinder, drawing the chuck attached to the head stock out of the cylinder. During the operation of the cam M to open the head stock the tail stock is opened or pulled away from the cylinder by the operation of the cam N which operates upon the rack 373 through a pin 219 and a lever 217, which rotates the pinion 302 and returns the rack 304. It also rotates the pinions 301, which pull the racks 300 that draw upon the tail stock 108 to pull it away from the cylinder 200.

When the finishing cut has been completed the cylinder is then removed from between the head stock and the tail stock and is carried to the mechanisms, which finish and chamfer the ends of the cylinder. The cylinder is carried by the rapid transit carrier which engages each cylinder when the finishing cutting tool has completed its work, and before the chucks begin to release.

The rapid transit carrier 380 is keyed to the shaft 381 which is supported in bearings 382 that are secured to the base 100. The shaft 381 is provided with a pinion 383 which is keyed thereto and is rotated by a rack 384, when moving the carrier 380 from between the chucks to the mechanism for finishing the ends of the cylinders and from the mechanism for finishing the ends to mechanism for chamfering the ends and to the point of delivery of the cylinder from the carrier and back to the point of engagement with the carrier with the cylinder between the chucks. The shaft 381 is also provided with a clutch member 385 which is slip-keyed to the shaft 381. The clutch member 385 engages with the worm wheel 386 which is operated by the worm 387. The worm wheel 386 is supported on the shaft 381 for free rotation relative to the shaft until it is connected therewith by the clutch 385. The yoke 388 is supported in bearings 389 secured to the base 100 and is provided with pins 390 which extend into a two part ring 391 located in a channel of the clutch member 385. The yoke 388 is tilted to shift the clutch member 385 along its key and the shaft 381 to engage and disengage the worm gear wheel 386. The yoke 388 is tilted by the rods 392 and 393, which operate upon adjusting pins 394 and 395 located in a cross member 396 secured to or forming a part of the yoke 388. When the rack 392 is lifted the clutch member 385 engages with the worm gear wheel 386 and when the rack 393 is lifted the rack 392 is pushed down and the clutch member 385 disengages from the worm gear wheel 386. The racks 392 and 393 operate to connect the worm gear wheel 386 with the shaft 381 to rotate the carrier when it is being operated upon by the end finishing tools, producing thereby a slow and steady movement of the carrier 380 when passing the finishing tool.

The worm 387 is supported in a bracket 400 which is secured to the base 100. It is connected by a shaft to the pulley wheel 401. The pulley wheel 401 is driven by the belt 402 which passes over a pair of idlers 403 and over the pulley wheel 404 which is keyed to the shaft 113 that is driven by the pulley wheel 112, the belt 111, the pulley wheel 103 and the belt 101.

The carrier 380 comprises an arm 410 and locking members which are supported on the arm 410. The arm 410 is keyed to the shaft 381. An engaging hook or latch 411 is secured to a pivoted block 412 which is pivoted on a cylindrical lug 413 that sockets in a recess formed in the upper end of the arm 410. It may be keyed in position by means of a pin 414. The hook 411 is bolted to the block 412 by bolts which pass through slots 415 and the hook may be thus adjustably secured to the block 412. A locking member 416 is pivoted to an arm 417 which is bolted to the arm 410 by a bolt passing through a slot 418, whereby the position of the locking member 416 may be adjusted with reference to the arm 410. The locking member 416 is provided with a head having a V-recess or niche 419 and is disposed to the rear of the engaging head of the hook. The hook 411 is provided with a slot 420 into which extends a lug 421, which prevents any lateral movement of the head of the hook 411 and the head of the locking member.

When the carrier 380 is raised the hook 411 strikes against the cylinder 200 and raises the hook 411, which by its weight drops in front of the cylinder, and at the same time the V-recess in the head of the locking member engages the rear side of the cylinder and thus the cylinder is held at three points in position between the head of the hook and the head of the locking member. This forms the carrier vise.

When the head of the hook 411 is dropped over the cylinder 200 and the cylinder is engaged between the head of the hook and the head of the locking member the locking member locks the cylinder 200 in position. This is performed by the operation of a threaded rod 425 which is located in the arm 410. A nut 426 is also located in the arm 410 into which the rod 425 threads. A pinion 427 is keyed to the rod 425. A rack 428 extends through the arm 410 and operates upon the pinion 427 to rotate the rod 425 to move the rod 425 in and out. An adjustable pin 429 is located in the locking member 416 and in alinement with the rod 425. When the rack 428 is moved in one direction through the arm 410 the rod 425 is moved out and against the adjustable pin 429, which forces the head of the locking member 416 against the cylinder 200 and clamps vise-like the cylinder between the head of the locking member and the head of the hook 411. The rack 428 is operated by means of the rack 435 which is supported in a bracket 436 that is bolted to the base 100. A pinion 437 is also supported between lugs formed in the upper end of the bracket 436 and is operated upon by a rack 438. The rack 435 meshes with the pinion 437 and when the rack 438 is lifted the rack 435 is pushed against the rack 428, which rotates the pin 425 and locks the cylinder 200 in the carrier vise. The rack 438 is movable in the bracket 436 and is provided with a spring 439 which is located intermediate a portion of the bracket 436 and a collar 440 which is secured to the rack 438 to cause the return of the rack 438 after the same has been lifted by the cam with which it is connected.

The cam P releasing the rack 384 through a pin 219 and a lever 217 permits the weight 379 operating on the pulley 378 to which it is connected by the strap 376 to lift the carrier to engage with the cylinder. The cam Q operating through a pin 219 and a lever 217 lifts the rack 438 to move the rack 435 against the rack 428 and to rotate the rod 425 and thus lock the carrier vise to securely hold the cylinder 200 in the carrier 380. The rack 384 is then raised by the operation of the cam P and the carrier is moved to the mechanism for finishing the ends of the cylinder.

When the cylinder 200 reaches to near the point where the end finishing tool will begin to cut the face of the cylinder, the rack 392 is lifted by the operation of the cam V operating through a pin 219 and a lever 217 which throws the clutch 385 to connect the worm gear wheel 386 to further rotate the carrier 380 and while it is passing the end finishing tools.

The end finishing tools are secured in heads 445 by means of bolts 446. Each head 445 is secured to a shaft 447 which is supported in U-brackets 448. The shaft 447 is supported in suitable roller bearings for free rotation of the shaft. A gear wheel 449 is keyed to the shaft for the purpose of rotating the head 445. A gear wheel 450 is keyed to a sleeve 443 which is also supported in the U-brackets 448 on roller bearings for free rotation of the sleeve. The gear wheel 451 meshes with the gear wheel 450. The shaft 452 is also supported in a bearing 458 located on one end of the base 100. The pulley wheel 104 is keyed to the shaft 452 and the pulley wheel, shaft and gear wheel 451 are driven by the belt 102, which in turn drives the gear wheels 450, 449 and the cutting tool 444. The cutting tools of each set of gears are constantly driven by the belt 102 and as the carrier is moved by the worm 387 the ends of the cylinders are finished.

When the end finishing tools have completed their cut the worm is disconnected from the shaft 381 by the operation of the cam W operating on the rack 393 through a pin 219 and a lever 217, which disconnects the clutch 385 from the worm gear wheel 386. The cam P then continues to swing the carrier 380 by operating on the rack 384 until the cylinder 200 is in line with the chamfering tools 460.

The chamfering tools 460 are supported in heads 461 (Figs. 16 and 17). They are located in sockets 462 and each has a pin stem 463 which is locked in position by means of the screw 464 which binds on the pin of the chamfering tool. The cutting edge of the chamfering tool is properly positioned with reference to the center of the head 461 so that the edges of the chamfering tool will chamfer the ends of the cylinder.

The head 461 is secured to a rod 465 supported in the sleeve 443. The rod 465 is connected to the head 466 having spring-pressed pins 467 which press against a collar 468 that is threaded on the sleeve 451. The spring-pressed pins 467 operate to draw the rod 465 and the chamfering tool 460 away from the cylinder 200. The rod 465 is provided with a socket in which is located a ball 469 against which the movable pin 470 is pressed by a threaded pin 471 which is located in a bell crank lever 472. The bell crank lever is pivoted on a bracket 473 which is secured to the base 100. When the pin 471 is properly set it may be locked in position by means of the screw 474. The bell crank lever 472 is also provided with a screw 475 which may be adjustably secured in the bell crank lever 472. A rack 476 is pressed against the screw 475 by a cam located on the cam shaft 165. The rack 476 of one set of mechanisms for finishing the ends of the cylinders is operated through a lever 217 and a pin 219 by the cam X, while the rack 476 of the other mechanism is operated by the cam Y, operating through a pin 219 and a lever 217. The racks 476 are lifted to push the rods 465 and the chamfering tools 460 against the work to cut the edges of the cylinders. When this has been performed the cams X and Y release the racks 476, and at the same time the rack 384 swings the carrier 380 down to beneath the base 100.

The U-bracket 448 is supported on a bed plate 454 and is moved along the bed plate 454 by means of the screw 455 which is threaded into the head 456 of the pin 457 for the purpose of adjusting the U-bracket as well as adjusting the cutting tools supported by the U-bracket.

Rotation of the head 466 is prevented by the pin 477 which is secured to the flange 468 and passes through the head 466 to prevent the head from being turned by the friction existing between the heads of the spring-pressed pins 467 and the collar 468.

The rack 384 swings the carrier 380 until the cylinder 200 is placed in alinement with the pin 485 and the rack 428 is in alinement with the pin 486. The pin 486 is located in an arm 487 which is supported on a shaft 488 and the pin 486 is supported in an arm 489 also located on the shaft 488. The pin 486 is provided with a head 490 which, when the shaft 488 is rotated, will strike the end of the rack 428, which will rotate the rod 425 by means of the pinion 427 and unlock the vise of the carrier, that is, it will release the locking member 416. At the same time that the rack is being pushed through the carrier 380 the pin 485, which is spring-pressed by the spring 491, which is compressed by the arm 489, and which is located about the pin 485 and between the collar 492, and the arm 489 pushes the pin against the end of the cylinder 200, and when the rack 428 has released the cylinder 200 the compressed spring 491 snaps the cylinder from the jaws of the vise of the carrier, that is, from between the heads of the hook and the locking member. The pin 485 has a finger 497 which presses against the end of the bearing. The finger is held in position by the rod 498 which slips through the arm 489.

The shaft 488 is operated by means of a pin 219 which presses on an arm 494 also keyed to the shaft 488. The shaft 488 and the parts connected therewith are returned to their normal positions by means of the spring 495 which is connected to the arm 494 and the base 100.

The carrier 380 is then returned to the position of engaging the next cylinder by the operation of the weight 379 which is connected to the wheel 378, which operation is permitted by the cam P.

A means is provided for varying the speed of the mechanisms in order that during interims when the mechanisms may be operated together at a higher rate of speed they will be connected with the drive through high speed gears in order to produce the desired high rate of speed and also when functions are to be performed by the machine which require a low rate of speed the speed gears may be shifted so as to connect the drive with the mechanisms through the low speed gears. During the times that the cylinder is being turned while locked by the chucks and while it is being operated upon by the end finishing tools the machine is connected through the low speed gear wheels, and while the machinery is performing the operations of releasing the chucks, unlocking the binder and opening the head and tail stocks, the machine is operated through the high speed gear wheels.

The high speed gear wheels as shown in Fig. 32 connect the drive with the worm 160, which operates the shaft 165 operating on the worm gear wheel 164 through the gears 137, 150 and 151. The shaft 165 is driven at a slow speed by the pulley wheel 132 operating through the gear wheels 136, 138 and 139, the gear wheels 151 and 139 being connected to the worm 160. The clutch 152 connects either the gear wheel 136 or the gear wheel 137 with the pulley 132, according to the position of the clutch member 152. The clutch member 152 is shifted by the rod 156 movable in a sleeve 134. The rod 156 is moved by a bell crank lever 500 which is pivotally supported in brackets 501 secured to the base 100. A claw 502 engages burs 503 located on the end of the rod 156 and are locked in position by locking pins 504. The claw 502 is bolted to the bell crank lever 500 and operates when the bell crank lever 500 is tilted to pull or push the rod 156 to shift the clutch member 152 to cause a connection to be made through the high speed gears, namely, through the gear wheel 151, or through the low speed gear wheels, namely, through the gear wheel 139. The bell crank lever 500 is tilted and locked in its tilted position by cams R, S, T and U. The bell crank lever 500 is provided with arms 510 having heads 511. The heads are provided with pins 512, 513, 514 and 515. The pins 512 and 514 are locked in their positions in the heads by means of screws 516, while the pins 513 and 515 are spring-pressed by the springs 517 located in sockets formed in the heads, and are slip-keyed therein by pins 509, Collars 518 are secured to the pins 513 and limit the movement of the pins 513 under the operation of the springs 517.

The bell crank lever 500 is located beneath the shaft 165. The cam R operates on the pin 515 to compress the pin, but the lever 500 is held in position by the cam U which holds the lever in position by the pressure of the cam against the pin 512. Immediately as the cam U rides from the pin 512 to permit the lever 500 to swing under the action of the spring 517 operating on the pin 515 the cam S presses against the pin 514 and holds the clutch member 152 in position for connecting the gear wheel 137 with the sleeve 134 to which the pulley wheel 132 is connected. This is performed when the chucks are released and when the turning of the cylinder is completed. When the chucks have been clamped and the bearing is in position for turning, the cam T presses against the pin 513, and when the cam S releases the pin 514 the lever 500 is swung by the operation of the spring 517 operating on the pin 513 to shift the clutch 152 to connect the pulley wheel 132 with the slow speed gear wheel 139 to drive the worm 160 at a slow speed. Immediately after the bell crank lever 500 is thrown the cam U presses against the pin 512 and locks the bell crank lever 500 into position into which it is moved to connect the pulley wheel 132 with the speed gear wheel 139. When the turning has been completed the cam R again operates upon the pin 515, and when the bell crank lever 500 is snapped over the cam S holds the bell crank lever in its position to again hold it in connection with the high speed wheel 151.

The diagram shown in Fig. 37 indicates the periods of performance of the different mechanisms of the machine with reference to a single rotation of the cam shaft 165 to which are adjustably secured the cams that control and operate the mechanisms of the machine. The Figs. 38 to 61 show the cams as they are mounted in position on the shaft 165. This position of the cam shaft 165 is also shown in Fig. 1 of the drawing.

Figure 38:
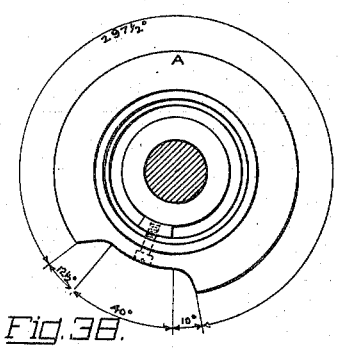

The cam A shown in Fig. 38 controls the operation of the magazine. When the roller 175 enters the depressed portion of the cam the magazine is lowered to a position such that the lowermost cylinder may be engaged by the centering pins or chucks of the head and tail stocks.

Figure 39:
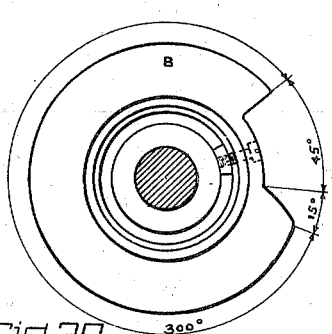

The cam B shown in Fig. 39 operates upon a pin 219 and a lever 217 to close the head stock. The pin 219 being located 90° in advance of the roller 175, the cam A is placed 90° behind the position that it would be placed in if the roller 175 were also located in line with the pins 219.

Figure 40:
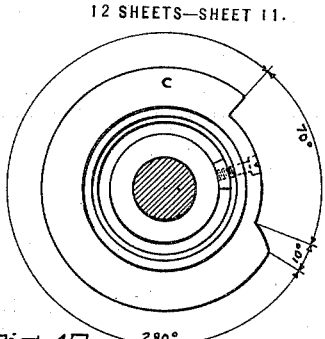
Figure 41:
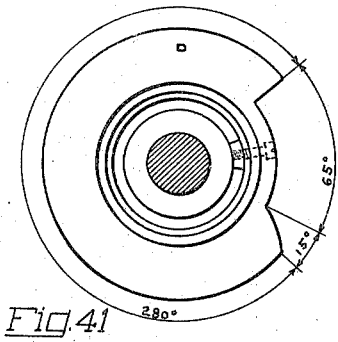
Figure 42:
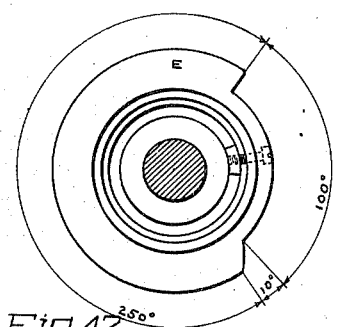

The cam C shown in Fig. 40 operates on a pin 219 to lock a head stock binder. The cam D shown in Fig. 41 operates on a pin 219 to close, namely, push the tail stock toward the head stock. The cam E illustrated in Fig. 42 operates on a pin 219 to tighten the chucks, that is, to pull the conical heads to cause the tongues 232 to spread and thus securely fasten the bearings between the head and tail stocks.

Figure 43:
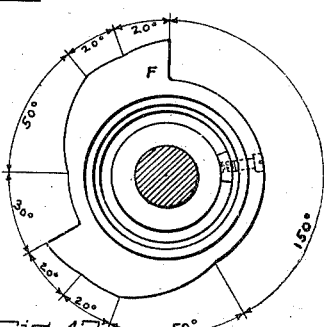

The longitudinal feed forward of the cutting tools 315 and 316 is performed by the cam F illustrated in Fig. 43. It operates on a pin 219 to cause the tools to be fed forward 50° and then to rest 20° while the tools are being pulled back for the purpose of bringing them in line with the edge of the flange. The cam then operates for 20° to feed the tools forward. A period is then allowed for the tools to be returned and to bring the smooth cutting tool in line with the smooth cut to be made on the bearing, whereupon through a period of 50° the cam F again feeds the tools forward for 20°. The cam rests in its operation while the tool is being thrown back to place it in line with the edge of the flange, and then for 20° the tool is again fed forward. The cam ceases its operation upon the pin 219 to allow the return of the tools and to bring the rough cutting tool in line with the next cylinder, that is placed between the head and tail stocks and to perform the operations of closing the tail stocks and the chucks upon the said next cylinder.

Figure 44:
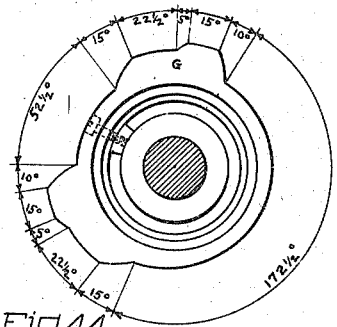

The cross feed of the tools, namely, withdrawing the tools from the body of the cylinder to a position where they may finish the flanges of the cylinders, is performed by the cam G illustrated in Fig. 44, which draws the tools away from the work on the body portion of the cylinder. The pin 219 is held in position during a period of 22½° at two points in the location of the cam G, namely, to cover the period of 20° when the cam F is cutting the flange. It also has periods of 5° followed by dwells of 50° which operate to further draw the tools from the work, namely, from the flanges, during which time the tools are returned to their initial positions. The 15° period is followed by a 10° period, during which the tools are again brought into alinement with the surfaces that are to be cut thereby. This is when the tools are returned by the return feed cam.

Figure 45:
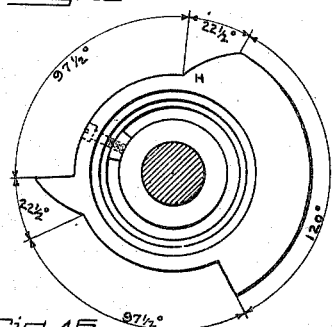

The longitudinal feed return of the tools is performed by the cam H illustrated in Fig. 45, which has periods of 22½° in which it operates on a pin 219 to cause the return of the tools, which cover a period of 15°, in which the tools are held away from the work by the cam G. The tools are held in their return position during a period of 120°.

Figure 46:
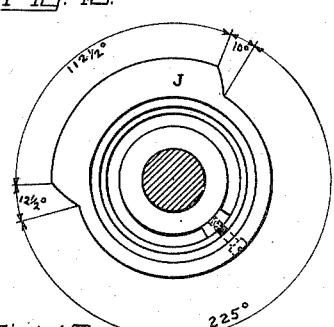

The tools are raised by the cam J, shown in Fig. 46, operating on a pin 219 through a period of 12½° which covers a portion of a period of 22½° when the work is returned by the operation of the cam H. The tools are held raised during a period of 112½° and during the period that the finishing cut is made upon the cylinder.

Figure 47:
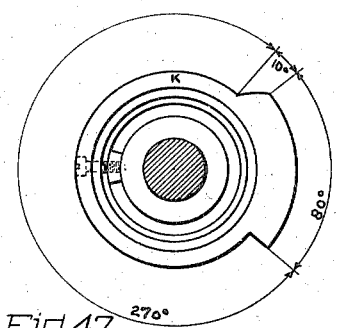

The cam K shown in Fig. 47 operates to release the chucks when the finishing cut has been performed. During a period of 10° it operates upon a pin 219 which opens the chucks.

Figure 48:
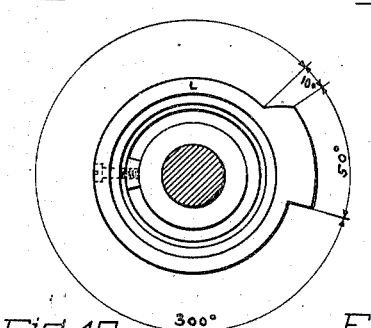

The cam L shown in Fig. 48 during a period of 10° following slightly the 10° of operation of the cam K operates on a pin 219 to unlock the binder of the head stock. It is held unlocked for 50° when the cam C operating through a period of 10° locks the binder.

Figure 49:
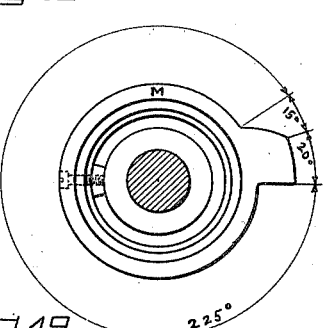

The cam M shown in Fig. 49 opens the head stock, that is, pulls the head stock away from the work. It operates on a pin 219 through a period of 15° upon the completion of the operation of the cam L on a pin 219.

Figure 50:
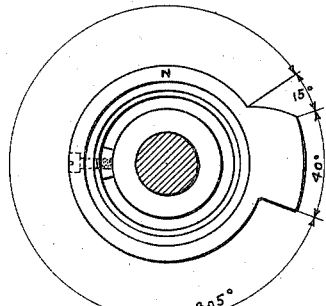

The cam N shown in Fig. 50 operates for a period of 15° to open the tail stock. It operates during the same period that the cam M operates to open the head stock.

Figure 51:
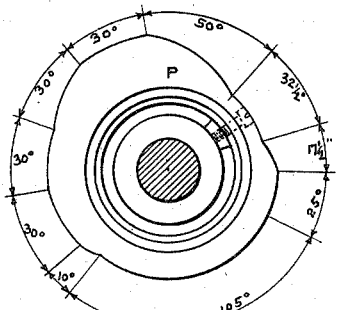

The rapid transit carrier operated by the cam P is illustrated in Fig. 51. The transit carrier is operated not only by the cam P but also during a part of the time by the worm 387. During a period of 105° the cam P is idle, during which time the worm operates the carrier while the end finishing tools are at work. During a period of 10° it moves the pin 219 to catch up with the worm, and during a period of 30° it continues to lower the carrier to the chamfering tools. During a period of 30° the carrier is held, during which period the chamfering is produced by the chamfering tools. This is then followed by a period of 30° in which it is lowered to its lowermost point. A period of 30° follows, during which period the vise of the carrier is unlocked and the cylinder is ejected from the carrier. The carrier is raised during the period of 50°. This is followed by a period of 32½°, during which period the vise is locked, which is followed by a period of 17½° during which the carrier is lowered, followed by a period of 25° in which the cam P holds the pin on which it operates while the worm is connected to the carrier, and it takes up the movement of the carrier to carry it by the end finishing tools. Then follows the 105° period of idleness, in turn followed by the 10° in which the cam P moves the pin so as to take the carrier from the operation of the worm and prevent any lost motion of the carrier by reason of the interchange from the drive or movement produced by the worm to the drive or movement produced by the cam P.

Figure 52:
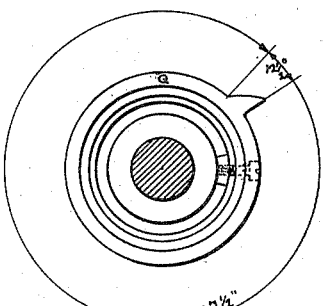
Figure 53:
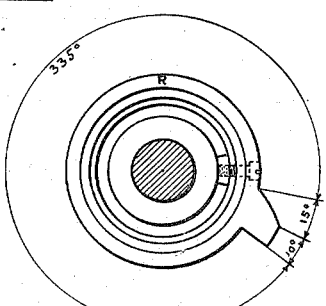

Locking the carrier vise is performed by the operation of the cam Q illustrated in Fig. 52. It operates on its connected rack during a period of 12½° during which the cam P holds the carrier in its raised position during a period of 32½°.

The cam R operates upon the bell crank lever 500 and particularly the spring-pressed pin 515 to cause the lever 500 to snap forward and make connection through the high speed gear between the drive and the shaft 165, which carry the cams. The diagram shown in Fig. 37 indicates the period of operation of the cam R with reference to the time of the performance of the elements of the machine. The pin 515, however, being located 45° in advance of the pins 219 the cam operating surface of the cam R is located to bring the performance of the cam to be accomplished at the proper time with reference to the operations of the other cams. The cam R operates upon the pin 515 during a period of 15°, which begins 2½° before the completion of the second returning of the longitudinal feed by the operation of the cam H. The pin 515 is held for a period of 10°, during which time the pin 512 is released from the cam which operates on it, and the pin 514 rides on the surface of the cam S shown in Fig. 59. Intermediate the periods of release of the pin 512 and the engagement of the pin 514 the bell crank lever 500 is snapped over by the operation of the pin 515.

Figure 54:
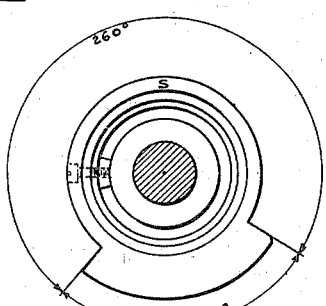
Figure 55:
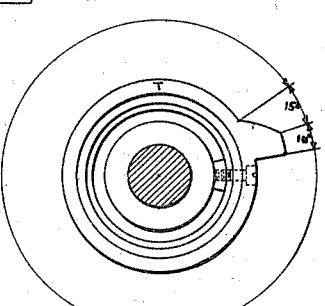

The cam S, shown in Fig. 54, holds the bell crank lever in the position into which it is moved by the coaction of the cam R and the spring 515 during a period of 100°.

The cam T operates substantially the same as the cam R to throw the bell crank lever 500 in the opposite direction. The cam T operates upon the yielding pin 513 during a period of 15° and some time during a period of 10° the pin 514 rides off of the cam S, and the bell crank lever 500 is snapped over by the pin 513. Also, during a period of 10° the pin 512 rides on the cam U.

Figure 56:
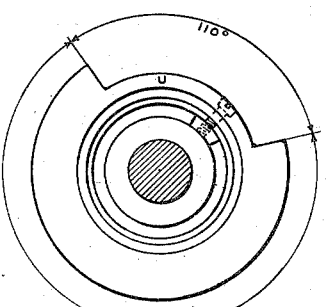

The cam U shown in Fig. 56 locks the bell crank lever so as to hold the connection between the cam shaft 165 and the pulley wheel 132 through the low speed gears for a period of 250°, during which time the cutting tools 315 and 316 are operating on the cylinder 200 and are being returned to their normal positions by the operation of the cams F, G and H.

Figure 57:
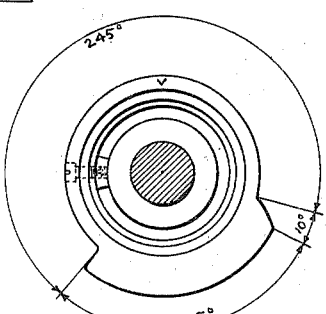

The cam V illustrated in Fig. 57 operates to connect the worm 387 which is driven by the pulleys 401 and 404 with the shaft 381 by the operation of the clutch 385. The clutch is operated by the rack 392 which is connected by a lever 217 and a pin 219. The connection or engagement is made during a period of 10° and the engagement is retained during a period of 105°. This is when the rapid transit carrier has been lowered by the cam P and the worm wheel 386 continues to rotate the shaft 381, which lowers the rapid transit carrier 380 while the ends of the cylinders 200 are being finished by the end cutting tools 444.

Figure 58:
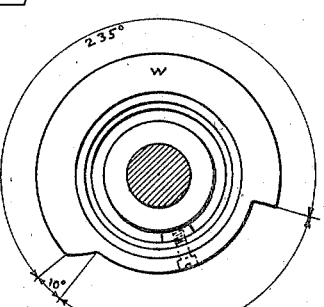

The cam W illustrated in Fig. 58 operates to throw the clutch 385 in the opposite direction in order to disconnect the worm wheel 386 with the shaft 381, which is performed during a period of 10°, which follows the period in which the clutch is kept closed by the operation of the cam V. The cam W lifts on the rack 393 to keep the clutch open during the balance of the single rotation of the cam shaft 165.

Figure 59:
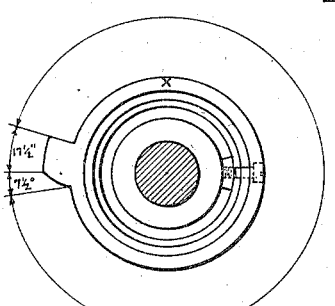

The cam X illustrated in Fig. 59 operates to close the chamfering tools after the transit carrier has been lowered so as to place the ends of the cylinder 200 between the chamfering tools 460. The chamfering tools 460 are then pushed against the edges of the cylinder and the edges are chamfered by the rotation of the tools about the axis of the cylinder. The cam X operating through a pin 219 and a lever 217 raises the pin 476 which, operating through the bell crank lever 472, pushes in the pins 471 and 470, the rod 465 and the chamfering tools 460. This engagement is made during a period of $7\frac{1}{2}°$ and occurs about $2\frac{1}{2}°$ after the rapid transit carrier has lowered the bearing to the chamfering tool. The tools are cut for a period of $17\frac{1}{2}°$, whereupon the pin 476 is released by the operation of the cam X.

Figure 60:
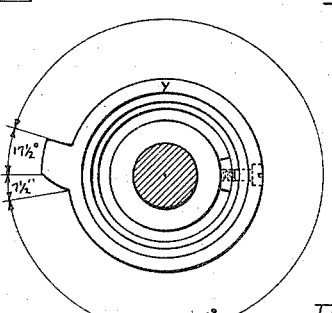
Figure 61:
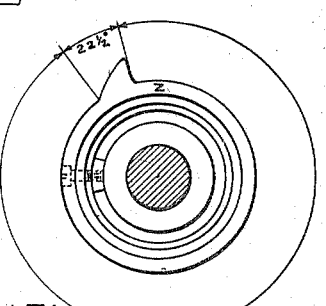

The cam Y illustrated in Fig. 60 is identical in form, contour and operation to the cam X. It operates on the other chamfering tool and also operates at the same time that the cam X operates on the chamfering tool which is connected with it through a rack 476, a lever 217 and a pin 219.

The cam Z operating through a pin 219 and the arm 494 connected to the shaft 488 operates, first, to push the rack 428 through the rapid transit carrier 380 to rotate the pinion 427 and to unlock the vise of the rapid transit carrier, that is, to release the head 419 of the locking member 416. While the arm 487 is operating to unlock the vise of the rapid transit carrier the rod 485 is being pushed against the cylinder 200 through the action of the arm 489 and the spring 491, and as soon as the cylinder is unlocked the rod 485 ejects the cylinder from the rapid transit carrier 380. The cam Z operates through a period of $22\frac{1}{2}°$ which occurs when the rapid transit carrier operating through the cam P is held during a period of 30° at the lowermost point to which the rapid transit carrier is lowered. The unlocking and discharge is completed about 5° before the rapid transit carrier again starts in its upward movement permitted by the cam P.

The periods of time and the sequence of operations of the cams illustrated in the Figs. 38 to 61 inclusive are set forth in the diagram illustrated in Fig. 37. The periods of time are measured in the degrees of rotation of the cam shaft 165. The zero or 360° position of the cam shaft is illustrated in Fig. 1 of the drawing. The cams are so located on the shaft that they will control or operate the mechanisms of the machine at the times and during the periods indicated in the diagram and consequently the times of operations of the cams and the mechanisms which they control may be obtained from the diagram. The magazine is lowered to bring the lowermost cylinder between the head and tail stocks, and the head and tail stocks then rotate the cylinder while the finishing tools are rough cutting and smooth cutting cylinders. Meantime the rapid transit carrier is being moved and lowered, during which time the end tools operate upon the cylinders which are locked in the rapid transit carrier. While the turning of the bearing and the re-turning of the tools is being completed the cylinders are unlocked from the rapid transit carrier and the rapid transit carrier is raised to engage with the cylinder which has just been completed by the turning tools, which is followed by the releasing of the chucks and the opening of the head and the tail stock, and so on, the mechanisms repeating their operations in the performance of the machine.

The construction selected and described may be greatly modified in the arrangement and manufacture of its parts and in the substitution of elements having equivalent functions, and such modifications may be used for many varied purposes and still be within the spirit of the invention and the scope of the claims.

What I claim is:

1. In a machine for finishing cylindrical objects the combination of a mechanism for surfacing the cylindrical surface of the work, mechanism for facing the ends of the work and mechanism for beveling the corners of the work and an automatic means for conveying the work from the first named mechanism to and by each of the last named mechanisms and means for controlling the movements of said means to move it by the facing mechanism and to hold it while the corners of the work are being beveled.

2. In a machine for finishing cylindrical objects the combination of a mechanism for surfacing the cylindrical surface of the work, mechanism for facing the ends of the work and mechanism for beveling the corners of the work and an automatic means for conveying the work from the first named mechanism to and by each of the last named mechanisms and means for controlling the movements of said means to move it by the facing mechanism and to hold it while the corners of the work are being beveled and to increase the rate of movement of the conveying means when the mechanism for beveling has completed its work.

3. In a machine for finishing cylindrical objects, the combination of a mechanism for surfacing the cylindrical surfaces of the objects and mechanism for facing the ends of the work and automatic means for engaging the work when the first mechanism has finished the cylindrical surface and conveying the work to the mechanism for facing the work.

4. In a machine for finishing cylindrical objects, the combination of a mechanism for finishing the cylindrical surface of the work, mechanism for facing the ends of the work, means for conveying the work from one mechanism to the other, and automatic means for reducing the speed of the machine while the mechanisms are operating on the work and increasing the speed while the conveying means is moving to convey the work from one mechanism to the other.

5. In a machine for finishing cylindrical objects the combination of a mechanism for finishing the cylindrical surface having a rough cut tool and a finishing cut tool and means for consecutively applying the tools, a mechanism for facing the ends of the work and a mechanism for beveling the corners of the work and a conveying means having a gripping means for gripping the work when the cylindrical surfaces are finished by the operation of the finishing tool and securely holding the work and conveying the work by the end facing mechanism and the beveling mechanism.

6. In a machine for finishing cylindrical objects, the combination of a mechanism for finishing the cylindrical surface of the objects, automatic means for clamping the objects in the mechanism, mechanism for finishing the ends of the objects and a conveying means having a gripping means for securing objects in the conveying means while in the mechanism for finishing the cylindrical surfaces and conveying the objects to the mechanism for finishing the ends of the objects and securely holding the objects while being operated upon by the end finishing mechanism and delivering the objects from the machine.

7. In a machine for finishing cylindrical objects, the combination of a mechanism for finishing the cylindrical surface of the objects, automatic means for clamping the objects in the mechanism, mechanism for finishing the ends of the objects and conveying means having a gripping means for securing objects in the conveying means while in the mechanism for finishing the cylindrical surfaces and conveying the objects to the mechanism for finishing the ends of the objects and delivering the objects from the machine, means for controlling the speed of the conveying means to decrease its speed and to stop its movement while the objects are being operated upon by the mechanism for finishing the ends of the work.

8. In a machine for finishing cylindrical objects, the combination of a pair of stocks, means for causing the stocks to clamp and unclamp the ends of the objects, a carrier longitudinally movable between the stocks, cutting tools supported by the carrier and automatic means for shifting the carrier longitudinally and transversely, means for lifting and lowering the carrier to bring the tools into operation on the object in succession.

9. In a machine, the combination of a driving pulley, head and tail stocks, cutting tools, a carrier for moving the tools relative to the work, cams and racks for closing the stocks and for connecting the head with the driving means and moving the carrier, and means for shifting the carrier to bring the tools into operation in succession.

10. In a machine, the combination of a longitudinally movable carrier, cutting tools supported by the carrier, a rotatable member connected to the carrier for shifting the carrier, racks and pinions for moving the rotatable member, and cams for moving the racks.

11. In a machine, the combination of a longitudinally movable carrier, cutting tools supported by the carrier, a rotatable member, a link for connecting the rotatable member with the carrier for shifting the carrier, racks and pinions for moving the rotatable member, and cams for moving the racks.

12. In a machine, the combination of cutting tools, a longitudinal carrier for supporting the tools, a rotatable member for shifting the carrier, a link, means for adjustably connecting the link with the rotatable member and the carrier.

13. In a machine, the combination of a longitudinally movable carrier having a plurality of tools, means for moving the tools to and away from the work in succession, cams and racks for moving the carrier and operating the moving means.

14. In a machine, the combination of a longitudinally movable carrier having a plurality of tools located one above the other, a head for supporting the tools and supported by a carrier, means for lifting the head for bringing the tools in line of operation of the work in succession.

15. In a machine, a longitudinally movable carrier, a head pivoted on the carrier, tools located in the head, one above the other, means for lifting the head to bring the tools in the line of operation with the work in succession.

16. In a machine, a longitudinally movable carrier, a cutting tool supported on the carrier, a threaded rod for moving the tool to and away from the work, pinions and racks for moving the carrier and shifting the tool, and cams for moving the racks.

17. In a machine, a longitudinally movable carrier, a transversely movable carrier located on the first named carrier, a threaded rod for shifting the last named carrier, a tool supported in the last named carrier, racks and pinions for shifting the carriers, and cams for shifting the racks.

18. In a machine, a tool carrier, a longitudinally movable carrier for supporting the first named carrier, a rack and pinion for shifting the longitudinally movable carrier, a rack and pinion for shifting the first named carrier transverse the second named carrier, a rack and pinion for tilting the first named carrier relative to the second named carrier.

19. In a machine, head and tail stocks, pinions and racks for closing and opening the stocks, a magazine for bearings located in the vicinity of the stocks, cams for shifting the magazine to between the stocks and for operating the racks to close the stocks onto a bearing in the magazine.

20. In a machine the combination of head and tail stocks, chucks located in the head and tail stocks and having tongues, cones, located within the chucks for spreading the tongues, automatic means for moving the cones for locking the chucks when the stocks are in position for engaging the work.

21. In a machine, head and tail stocks, chucks located in the head and tail stocks and having tongues, cones located within the chucks for spreading the tongues, cams for moving the cones, and a pinion and rack for moving the cams.

22. In a machine, head and tail stocks, chucks located in the stocks, a pulley for driving the stocks, a clutch for connecting the pulley with the head stock, cams for locking the chucks and operating the clutch, and a pinion and rack for operating the cams.

23. In a machine, a head stock, means for shifting the head stock to the work, and a binder for locking the head stock in its shifted position, means for automatically operating the binder.

24. In a machine, a head stock, means for shifting the head stock to the work, a stop for limiting the movement of the head stock, and a binder for locking the head stock in its position against the stop.

25. In a machine, a head stock and tail stock, means for shifting the stocks to the work in succession, and a binder for locking the head stock.

26. In a machine, a head stock and tail stock, means for shifting the stocks to the work in succession, a stop for limiting the head stock, and a binder for locking the head stock against the stop.

27. In a machine, a head stock, a rod for supporting the head stock, a sleeve surrounding the rod and contained within the head stock and having a flexible portion formed in the sleeve, a cam rod for operating on the flexible portion to bind the head stock to the supporting rod.

28. In a machine, the combination of a head stock, a flexible spring member connected to the head stock and means for operating the spring member for locking the head stock in position.

29. In a machine, head and tail stocks, means for holding the work between the head and tail stocks, a carrier having a vise for engaging the work, and means for moving the carrier to remove the work from between the head and tail stocks.

30. In a machine, a carrier, a vise having a latch member for automatically slipping over and engaging the work, and means for closing the vise.

31. In a machine, a carrier having an engaging latch for automatically slipping over and engaging the work, a locking jaw for locking the work between the engaging latch and the jaw, and a threaded member for locking the jaw.

32. In a machine, a carrier having jaws for engaging the work, a threaded member for clamping the jaws, and a rack and pinion for rotating the threaded member.

33. In a machine, a carrier having a latch engaging member and a jaw member coacting with the latch engaging member to clamp the work, a threaded member for operating the jaw member, and a rack and pinion for rotating the threaded member.

34. In a machine, a carrier having a vise, a threaded member for operating one of the jaws of the vise, a carrier having a rack and pinion for rotating the threaded member, and a pinion and rack for operating on the rack of the carrier.

35. In a machine, a carrier having a vise, a threaded member for operating one of the jaws of the vise, a carrier having a rack and pinion for rotating the threaded member, and a lever and cam for operating the rack.

36. In a machine, a carrier having a vise, a threaded member for operating one of the jaws of the vise, a carrier having a rack and pinion for rotating the threaded member, a pinion and rack for operating on the rack of the carrier, a third rack for operating the pinion, and a cam for operating the said racks and pinions.

37. In a machine, a carrier having a vise, a threaded member for operating one of the jaws of the vise, a rack and pinion for rotating the threaded member, means for moving the rack in one direction to clamp the jaws, and means for moving the rack in the opposite direction for unclamping the jaws.

38. In a machine, a carrier, the carrier having a vise for engaging the work, a threaded member for operating on one of the jaws of the vise when the carrier is in one position, means for moving the carrier, and means for operating on the threaded member when the carrier is in another position.

39. In a machine, a carrier having a vise, a threaded member for operating one of the jaws of the vise, a rack and pinion for rotating the threaded member, a cam for moving the rack in one direction, and a cam for moving the rack in the opposite direction.

40. In a machine, a carrier having a vise for engaging the work, a threaded member for operating one of the jaws of the vise, a pinion and rack for rotating the threaded member, a rack and pinion for moving the first named rack in one direction, a lever for moving the rack in the opposite direction, and a spring-pressed member for pressing on the work to eject it from the vise while the rack is being moved in the said opposite direction.

41. In a machine, a plurality of pairs of cutting tools, one pair of said tools for facing the work and the other of said tools for beveling the corners of the work, a carrier for moving the work by the first pair of tools and holding the work stationary while the other pair of tools is operating on the work.

42. In a machine, a carrier having a vise and a threaded member for operating one of the jaws of the vise, means for rotating the threaded member in one direction for gripping the work and means for rotating the threaded member in the other direction for releasing the work.

43. In a machine, end finishing tools, a conveyer for conveying the work to the end finishing tools and away from the end finishing tools, means for causing the movement of the carrier to and away from the end finishing tools and means for causing the movement of the carrier by the end finishing tools at a slower rate of speed than it is moved to and from the end finishing tools.

44. In a machine, head and tail stocks for rotating on the work, end finishing tools, a carrier for moving the work from between the stocks and moving the work between the end finishing tools.

45. In a machine, end finishing tools, a carrier, a rack and pinion for moving the carrier to the end finishing tools, a worm for moving the work between the end finishing tools.

46. In a machine, end finishing tools, a carrier, a rack and pinion for moving the carrier to the end finishing tools, a worm for moving the work between the end finishing tools, a clutch, and a rack and pinion for connecting the carrier with the worm through the clutch.

47. In a machine, a chamfering tool, means for withdrawing the chamfering tool from the work, a carrier, a rack and pinion for operating the carrier, and cams for operating on the means for withdrawing the tool from the work and for moving the chamfering tool to the work.

48. In a machine, head and tail stocks, means for moving the head and tail stocks, a cutting tool, a longitudinal carrier for supporting the tool, a chamfering tool, a second carrier for engaging and moving the work, pinions and racks for shifting the head and tail stocks and for moving the carriers and the chamfering tools, and cams for operating the racks.

49. In a machine, head and tail stocks, a longitudinally movable carrier, a tool supported in the carrier, a carrier for engaging and carrying the work, end finishing tools, a worm gear wheel for moving the work between the end finishing tools, a clutch for connecting the worm with the carrier, chamfering tools, means for moving the chamfering tools against the work, racks and pinions for shifting the head and tail stocks and moving the longitudinal carrier, the work engaging carrier and connecting and disconnecting the worm with the work, cams for operating the racks and bringing the chamfering tools to the work, and a shaft for supporting the said cams.

50. In a machine, head and tail stocks, a longitudinally movable carrier, a tool supported in the carrier, a carrier for engaging and carrying the work having a vise, a threaded member for operating on one of the jaws of the vise, end finishing tools, a worm gear wheel for moving the work between the end finishing tools, a clutch for connecting the worm with the carrier, chamfering tools, means for moving the chamfering tools against the work, racks and pinions for shifting the head and tail stocks and moving the longitudinal carrier, the work engaging carrier connecting and disconnecting the worm with the work engaging carrier, cams for operating the racks and bringing the chamfering tools to the work and for locking the jaws of the vise, and a shaft for supporting the cams.

51. In a machine, head and tail stocks, a longitudinally movable carrier, a tool supported in the carrier for cutting the cylindrical surface of the work in finishing tools, end finishing tools, a carrier for engaging the work while between the head and tail stocks and carrying the work between the end finishing tools.

52. In a machine, head and tail stocks, a longitudinally movable carrier, a rough cutting tool and a finish cutting tool supported in the carrier, means for shifting the carrier transversely to bring the tools into operation to form finished cylindrical surfaces on the work, end finishing tools and chamfering tools, a carrier for engaging the work while between the stocks and moving it by the end facing tools, and means for moving the chamfering tools to and from the work.

53. In a machine for finishing cylindrical objects, the combination of head and tail stocks, chucks located in the head and tail stocks, means for feeding the work between the head and tail stocks, means for bringing the head and tail stocks to the ends of the work, and automatic means for closing the chucks to grip the ends of the work.

54. In a cylindrical turning machine, the combination of a pair of chucks, means for feeding the work to the chucks, means for moving the head and tail stocks to the work, chucks located in the head and tail stocks for securing the work in position between the head and tail stocks, mechanism for removing surplus metal from the ends of the work, and means for conveying the work from the stocks to said mechanism.

55. In a machine for finishing cylindrical objects, the combination of a mechanism for surfacing the work, means for facing the ends of the work, means for conveying the work from the first mechanism to the second mechanism and to move it past the cutting tools of the second mechanism.

56. In a machine for finishing cylindrical objects, the combination of a mechanism for removing the surplus material from the cylindrical surface of the work, the means for facing the ends of the work, a mechanism for removing the burs that may be formed by the second named mechanism, and a clamping means for conveying the work from the first named mechanism to the second named mechanism and past the cutting tools of the second named mechanism and conveying it to and holding it in the central position as related to the third named mechanism.

57. In a machine for finishing cylindrical objects, the combination of a mechanism for surfacing cylindrical surface work, means for facing the ends of the work, a mechanism for removing the burs formed by the second named mechanism, a clamping means for conveying the work from the first named mechanism to the second named mechanism and past the cutting tools of the second named mechanism and conveying it and holding it in a correct position as related to the third named mechanism, and means for unlocking the clamping means, thus releasing the work.

58. In a machine for finishing cylindrical objects the combination of a means for causing rotation of the objects, mechanism for cutting ends of the objects and a conveyer for engaging the object while in the mechanism for causing rotation of the object and conveying it to and by the mechanism for cutting the end surfaces of the object.

59. In a machine for finishing cylindrical objects, the combination of a mechanism for surfacing the cylindrical surface of the work, mechanism for facing the ends of the work, automatic means for reducing the speed of the machine while the ends of the work are being faced, and means for increasing the speed of the machine when the facing of the ends of the work is completed.

In testimony whereof, I have hereunto signed my name to this specification.

AUGUSTUS F. DONALDSON.